United States Patent [19]
Cutler et al.

[11] Patent Number: 6,025,048
[45] Date of Patent: Feb. 15, 2000

[54] HYBRID CERAMIC MATRIX COMPOSITE LAMINATES

[75] Inventors: Willard A. Cutler, Corning, N.Y.; Fred F. Lange, Santa Barbara; Francis W. Zok, Goleta, both of Calif.

[73] Assignee: The Regents of the University of California, Oakland, Calif.

[21] Appl. No.: 08/496,494

[22] Filed: Jun. 29, 1995

[51] Int. Cl.$^7$ ........................................................ B32B 3/06
[52] U.S. Cl. ............................................ 428/105; 428/114
[58] Field of Search ........................................ 428/105, 114

[56] References Cited

U.S. PATENT DOCUMENTS 5,092,948  3/1992  Lange et al. .

OTHER PUBLICATIONS

Faber et al., "Quant. Studies of Thermal Shock in Ceramics Based on a Novel Test Technique," J. Am. Cer. Soc., v64, n5, pp. 296–301, May 1981.

Walker et al., "Prep. & Prop. of Monolithic & Composite Ceramics Produced by Polymer Pyrolysis," Ceramic Bulletin, v62, n8, pp. 916–923, 1983.

Jamet et al., "Composite Céramique, Relations entre Microstructure et Rupture," L'Aéronautique et L'Astronautique, 1987 –2/3 –N° 123/124, pp. 128–142.

Lange et al., "Pressure Filtration: Consolidation Kinetics & Mechanics," Ceramic Bulletin, v66, n10, pp. 1498–1504, 1987.

Glass et al., "Surface Modification of Ceramics by Partial Infiltration," Advanced Ceramic Materials, v2, n2, pp. 129–131, 1987.

Jamet et al., "Composite Ceramique, Relations entre Microstructure et Rupture," L'Aéronautique et L'Astronautigue, 1987 –2/3 –N 123/124, pp. 128–142.

Marple et al., "Incorp. of Mullite as a Second Phase into Alumina by an Infiltration Tech.," J. Am. Ceram. Soc., v71, n11, pp. C–471–C–473, Nov. 1988.

Sacks et al., "Prep of $SiO_2$ Glass from Model Powder Compacts: III, Enhanced Densif. by Sol Infiltration," J. Am. Ceram. Soc., v71, n4, pp. 245–249, Apr. 1988.

Lange et al., "Powder Processing & Densif. of Ceramic Composites," Presented at Materials Research Society Meeting, Apr. 1989.

Prewo et al., "Silicon Carbide Fibre–reinforced Glass–ceramic Comp. Tensile Behav. at Elevated Temp.," 1989, pp. 1373–1379.

Bischoff et al., "Microstructural Studies of the Interfacial Zone of a SiC–Fiber–Reinforced Lithium Aluminum Silicate Glass Ceramic," J. Am. Ceram. Soc., 72[5] 741–45 1989.

Velamakanni et al., "New Meth. for Eff. Colloidal Part. Packing via Modulation of Repul. Lubric. Hydr. Forces," Langmuir, v6, n7, 1323–1325, 1990.

Lange et al., "Meth. for Processing Metal–Reinforced Ceramic Composites," J. Am. Ceram. Soc., v73, n2, pp. 388–393, 1990.

Zok et al., "Packing Density of Composite Powder Mixtures," J. Am. Ceram. Soc., v74, n8, pp. 1880–1885, 1991.

(List continued on next page.)

*Primary Examiner*—Christopher Raimund
*Attorney, Agent, or Firm*—Daniel L. Dawes

[57] ABSTRACT

A hybrid CMC laminate is comprised of alternating layers of dense ceramics and fiber reinforced CMCs. The strategy involves the use of strong and stiff ceramics in order to delay the onset of cracking within the CMC layers. To provide protection from mechanical abrasion, improve thermal conductivity and inhibit oxygen ingress into the CMC layer, ceramic layers are placed on the outer surfaces of laminate. The laminate is produced by stacking alternating layers of dense ceramic and binderless layers of fiber reinforced CMCs, and then hot-pressing them together. The volume fractions of the constituent layers and the fiber architecture can be readily varied through this process. Reinforcement architecture (unidirectional vs. crossply) and the relative volume fractions of the phases effects the tensile and flexural properties of the laminates.

7 Claims, 16 Drawing Sheets

OTHER PUBLICATIONS

Schneider et al., "Thermal Shock Testing of Ceramics—A New Testing Method," J. Am. Ceram Soc., v74, n1, pp. 98–102, 1991.

Sudre et al., "Effect of Inclusions on Densif.: 1, Microstructural Devel. in an $Al_2O$. Matrix Cont. a High vol. Frac. of $ZrO_2$ Inclusions," J. Am. Ceram. Soc, v73, n3, 519–24, 199.

Folsom et al., Mech. Beh. of a Laminar Ceramic/Fiber–Reinforcal Epoxy Composite, J. Am. Ceram. Soc., v75, n11, pp. 2969–75, 1992.

Lam et al., Mech. Prop. of Partially Dense Alumina Produced from Powder Compacts, J. Am. Ceram. Soc. v77, n8, 2113–17, 1994.

Folsom et al., "Flex. Prop. of Brittle Multilayer Materials: 1, Modeling," J. Am. Ceram. Soc., v77, n3, pp. 689–96, 1994.

Folsom et al., "Flex. Prop. of Brittle Multilayer Materials: II, Expts," J. Am. Ceram. Soc., v77, n8, pp. 2081–2087, 1994.

Tu et al., "A Novel, Damage–Tolerant Ceramic Comp. (Synth. High–Temp. Wood," University of California, Santa Barbara, 1994.

Tu et al., "Liquid Precursor Infil. & Pyrolysis of Powder Comp., I: Kinetic Studies & Microstructure Devel.," Univ. of Cal., Santa Barbara, 1994.

Tu et al., "Liq. Precursor Infil. & Pyrolysis of Powder Comp: II, Fracture Toughness & Strength," Univ. of Cal., Santa Barbara, 1994.

FIG. 4c
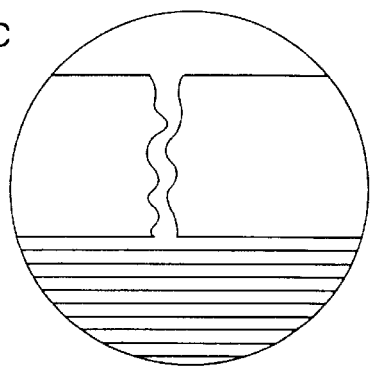
FIG. 4d
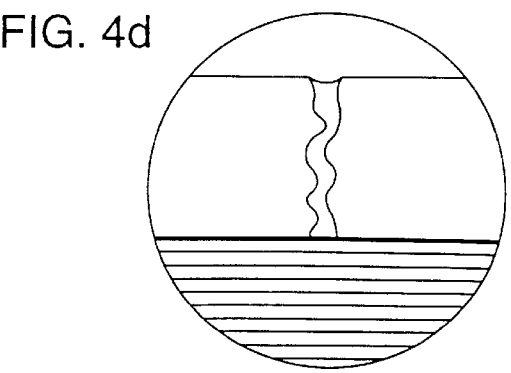
FIG. 5a
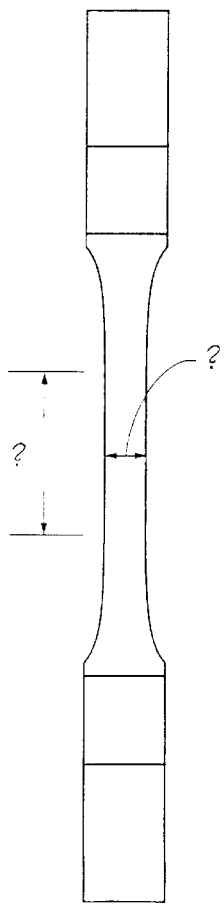
FIG. 5b
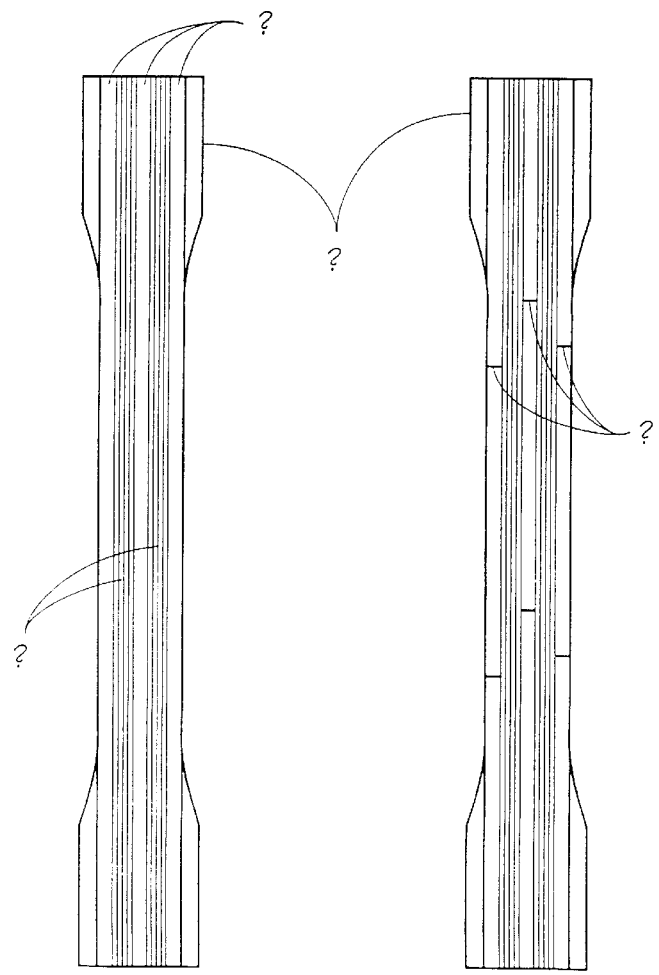
FIG. 5c

HYBRID CERAMIC MATRIX COMPOSITE LAMINATES

This invention was made with Government support under Contract No. N00014-92-J-1808, awarded by the Office of Naval Research. The Government has certain rights in this invention.

BACKGROUND OF THE INVENTION

1. Field of the Invention

The invention relates to hybrid laminate composites, and in particular to composites having alternating layers of dense ceramic and fiber-reinforced ceramic matrix composite (CMC) layers.

2. Description of the Prior Art

Fiber-reinforced ceramic matrix composites (CMCs) are used for high temperature components subject to severe thermal and mechanical loads. The key material property requirements include high failure strain, good damage tolerance and thermal shock resistance, and microstructural stability in oxidizing environments. Resistance to wear and abrasion and high thermal conductivity are also important.

The majority of CMCs developed to date undergo matrix cracking at relatively low stress levels, particularly in cross-ply and woven fiber architectures. Cracking usually begins in the off-axis plies and subsequently progresses through to the 0 plies. The cracks in the 0 plies are accommodated by debonding and sliding along the fiber-matrix interface. It has been recognized that such cracking is necessary in order to achieve high damage tolerance and notch-insensitive behavior. However, the cracks form pathways for oxygen ingress into the composite. For non-oxide CMCs, this invariably leads to oxidation of both the fiber coatings and the fibers, which, in turn diminishes the tensile properties dramatically. See, T. Mah, M. G. Mendiratta, A. P. Katz, R. Ruh and K. S. Mazdiyasni, *"High-Temperature Mechanical Behavior of Fiber-Reinforced Glass-Ceramic-Matrix Composites,"* J. Am. Ceram. Soc. 68 [9] (1985) C-248-C-251.

One object of the invention is to produce hybrid CMC laminates that exhibit good potential for high temperature applications which are not subject to the foregoing defect.

Although the production and properties of laminates is described generally in Lange et.al., *"Fiber Reinforced Laminated Ceramic Composites and Method Thereof,"* U.S. Pat. No. 5,092,948 (1992), Folsom et.al., "Mechanical Behavior of a Laminar Ceramic/Fiber-Reinforced Epoxy Composite", J.Am.Ceram.Soc. 75 [11] at 2969–75 (1992); Folsom et.al., "On the Flexural Properties of Brittle Multilayer Materials I, Modeling", J.Am.Ceram.Soc. 77 [3] at 689–96 (1994a); and Folsom et.al., "On the Flexural Properties of Brittle Multilayer Materials II, Experiments", J.Am.Ceram.Soc. 77 [8] at 2081–87 (1994b), the interface between the sintered ceramic and the fiber layer is crack deflecting or weak, while the fiber layer itself has no mechanism to deflect cracks. Such conditions when extended to high temperature materials do not produce the desired effect.

Therefore what is needed is some way to incorporate a strong sintered ceramic/fiber-reinforced CMC interface and a crack deflecting mechanism with the CMC layer to obtain thermal shock resistance, delayed cracking in the CMC layer to high stress levels.

Further, it is an object of the invention to create larger and more complexly shaped structures which have these improved properties.

BRIEF SUMMARY OF THE INVENTION

The invention is a hybrid laminate comprising a plurality of sintered ceramic layers, and a plurality of fiber-reinforced ceramic matrix composite (CMC) layers. Each of the plurality of sintered layer alternate with each the fiber-reinforced CMC layers. The plurality of sintered ceramic layers and fiber-reinforced CMC layers are strongly bonded to form a consolidated stack of layers. As a result, a high temperature, damage tolerant, thermal shock resistant, oxidation resistant, high strength laminate is obtained, which is resistant to wear, abrasion and has high thermal conductivity.

The sintered ceramic layers are strong and stiff to delay onset of cracking within the fiber-reinforced CMC layers when the laminate is stressed. The bonding between the sintered ceramic and the fiber-reinforced CMC is strong.

The fiber-reinforced CMC layer comprises a mechanism for deflecting cracks either at the fiber/matrix interface or within the matrix itself.

The sintered ceramic layers and fiber-reinforced CMC layers are selected based on desired constituent volume fractions, thermal strain mismatch, crystallization strain mismatch, and intrinsic strain to tailor the laminate properties.

In one embodiment the fibers are aligned unidirectionally within the fiber-reinforced CMC layer. In another embodiment the fibers are aligned in a multidirectional pattern within the fiber-reinforced CMC layer.

The fiber-reinforced CMC layers comprise a predetermined volume percentage above a critical level, so that after the onset of laminate cracking, an increase in load bearing capacity is achieved.

The sintered ceramic layer is selected from a group consisting of silicon carbide, silicon nitride, SiAlON, aluminum oxide, mullite, or similar carbides, nitrides, borides or oxides or combinations thereof.

The fibers are selected from the group of Nicalon, silicon carbide, graphite, glass, aluminum oxide, mullite, carbon, zirconium oxide or combinations thereof.

The matrix surrounding the fibers within the fiber-reinforced CMC are selected from the group of silica, glass, glass-ceramic, ceramics, carbides, nitrides, oxides or combinations thereof.

The invention is also defined as a method of fabricating a laminate comprising the steps of providing a plurality of sintered ceramic layers and a plurality of fiber reinforced CMC layers. Alternate layers of the sintered ceramic and fiber-reinforced CMC layers are stacked together to form the laminate. The fiber-reinforced CMC layers, which include a means for deflecting cracks, are consolidated to a predetermined density so that a volume percentage of the fiber-reinforced CMC layers in the laminate is above a critical volume percentage. The stacked layers are strongly bonded together into an integral body. As a result, a high temperature, damage tolerant, thermal shock resistant, oxidation resistant, high strength laminate is obtained, which is resistant to wear, abrasion and has higher thermal conductivity.

The step of providing the plurality of sintered ceramic layers and the plurality of fiber reinforced CMC layers comprises selecting the sintered ceramic layers and fiber-reinforced CMC layers based on desired constituent volume fraction, thermal strain mismatch, crystallization strain mismatch, and intrinsic strain mismatch to tailor the laminate properties.

The steps of consolidating and bonding are performed at a temperature from 600 deg. C. to 1700 deg C., at a pressure from 0 to 2000 pounds per square inch, and in an environment which is either a vacuum of $10^{-1}$ to $10^{-8}$ torr or an inert gas.

In another embodiment the steps of consolidating and bonding are performed at a temperature from 600 deg. C. to 1700 deg. C., at a pressure from 0 to 2000 pounds per square inch, and in an environment which is comprised of either nitrogen, argon, or air.

In still another embodiment the steps of consolidating and bonding are performed at a temperature of 600 deg. C. to 1700 deg. C., at zero pressure, and in an environment which is comprised of either a vacuum of $10^{-1}$ to $10^{-8}$ torr, inert gas, or air.

In yet another embodiment the laminate is fabricated from a plurality of tiles wherein each individual layer the sintered ceramic layers are comprised of a plurality of tiles and the fiber-reinforced CMC layers are continuous.

Alternatively, the laminate is fabricated from a plurality of tiles wherein each sintered ceramic layer and each fiber-reinforced CMC layer are comprised of a plurality of tiles.

In the case where a layer is comprised of a plurality of tiles, joints are defined between adjacent tiles. The method further comprises the steps of sealing the joints between the plurality of tiles using a glass, glass-ceramic, ceramic, or ceramic precursor by coating, electrophoretic deposition, vapor deposition or some combination thereof.

In one embodiment stacking the alternate layers of the sintered ceramic and fiber-reinforced CMC layers to form the laminate is performed only at discrete positions to locally reinforce the fiber-reinforced CMC layer.

In another embodiment the step of consolidating the fiber-reinforced CMC layers is performed independently for each layer. The laminate is then strongly bonded using a thin layer of matrix on at least one adjacent surface of adjacent ones of the sintered ceramic and fiber-reinforced CMC layers to form the laminate.

The invention may be better visualized by considering the following drawings wherein like elements are referenced by like numerals.

BRIEF DESCRIPTION OF THE DRAWINGS

FIGS. 4a–e depict complex-shaped objects fabricated using a mosaic approach, namely FIG. 4(a) is a side elevational view of a curved mosaic laminate 10, FIG. 4b is a perspective view of a T-shaped laminate 10, FIG. 4c is an enlarged side cross-sectional view showing a joint in the mosaic before sealing, and FIG. 4d shows is an enlarged side cross-sectional view showing the joint in the mosaic after sealing. FIG. 4e is a cross-sectional side view of a CMC having hybrid multlayer compositing around a location of stress concentration.

FIGS. 5a–c are schematics illustrating the tensile specimens tested. FIG. 5a is a front view of tensile specimens (L about 100 mm for SiC-based laminates and about 150 mm for SiAlON and $Si_3N_4$-based laminates. FIG. 5b is a side view of SiC and $Si_3N_4$-based laminates. FIG. 5c is a side view of SiAlON based laminates created using a mosaic approach of FIG. 3. Note that the gauge region is all continuous ceramic and contains no seams.

The invention and its various embodiments can now be understood in the context of the illustrated embodiments as described in the following detailed description.

DETAILED DESCRIPTION OF THE PREFERRED EMBODIMENTS

A hybrid CMC laminate is comprised of alternating layers of dense ceramics and fiber reinforced CMCs. The strategy involves the use of strong and stiff ceramics in order to delay the onset of cracking within the CMC layers. To provide protection from mechanical abrasion, improve thermal conductivity and inhibit oxygen ingress into the CMC layer, ceramic layers are placed on the outer surfaces of laminate. To achieve high cracking stress ceramic layer(s) can be place internally or externally. The laminate is produced by stacking alternating layers of sintered ceramic and fiber reinforced CMCs, and then strongly bonding them together. The volume fractions of the constituent layers and the fiber architecture can be readily varied through this process. Reinforcement architecture (unidirectional vs. multidirectional) and the relative volume fractions of the phases effects the tensile and flexural properties of the laminates.

Figure 1:
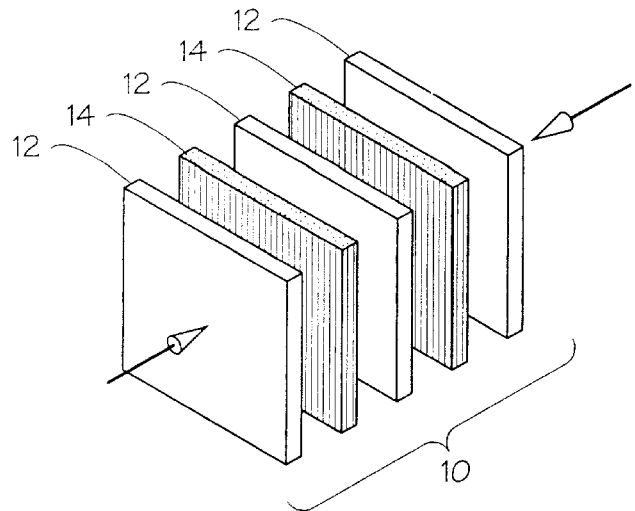
FIG. 1 is a schematic of a laminate lay-up, illustrating the stacking of alternating layers of dense ceramic and fiber-reinforced CMCs.

The illustrated embodiment is a hybrid CMC laminate 10 comprised of alternating layers of sintered ceramics 12 and fiber reinforced CMCs 14 as shown in simplified exploded perspective view in FIG. 1. The strategy involves the use of strong and stiff ceramics 12 in order to delay the onset of cracking within CMC layers 14. Moreover, to provide protection from mechanical abrasion, improve thermal conductivity and inhibit oxygen ingress into CMC layer 14, ceramic layers 12 are placed on the outer surfaces of laminate 10 as depicted in FIG. 1. Laminate 10 is produced by stacking alternating layers 12 of sintered or dense ceramic and binderless layers of fiber reinforced CMCs 14 and then strongly bonding or hot-pressing them together. The volume fractions of the constituent layers and the fiber architecture can be readily varied through this process.

Analogous low-temperature laminates have previously been produced using carbon fiber reinforced epoxy (CFRE) and $Al_2O_3$. See, F. F. Lange, D. B. Marshall and C. A. Folsom, *"Fiber Reinforced Laminated Ceramic Composites and the Method Thereof,"* U.S. Pat. No. 5,092,948, Mar. 3 (1992); C. A. Folsom, F. W. Zok, F. F. Lange and D. B. Marshall, *"Mechanical Behavior of a Laminar Ceramic/Fiber-Reinforced Epoxy Composite,"* J. Am. Ceram. Soc. 75 [11] (1992) 2969–2975; C. A. Folsom, F. W. Zok and F. F. Lange, *"On the Flexural Properties of Brittle Multilayer Materials: I, Modeling"* J. Am. Ceram. Soc. 77 [3] (1994) 689–696; and C. A. Folsom, F. W. Zok and F. F. Lange, *"On the Flexural Properties of Brittle Multilayer Materials: II, Experiments,"* J. Am. Ceram. Soc. 77 [8] (1994) 2081–2087.

The constituent layers 12 and 14 were selected on the basis of desired constituent volume fractions, thermal strain mismatch, crystallization strain mismatch, and intrinsic strain to tailor the laminate properties. The effects of volume fraction of the constituent layers and the fiber architecture on the tensile and flexural properties are described below. In addition, rudimentary tests to assess the thermal shock resistance of these materials is discussed below.

A range of sintered ceramic 12 can be use, but three types were used in the illustrated embodiments: SiC (Hexoloy SA—Carborundum), SiAlON (CM200—Ceramic Process Systems) and $Si_3N_4$ (SN220—Kyocera). Their properties are summarized in Table 1 below.

TABLE 1

| Properties of the Ceramics | | | |
|---|---|---|---|
| Dense Ceramic | Silicon Carbide | Silicon Nitride | Silicon Nitride |
| Supplier | Carborundum | Ceramic Process Systems (CPS) | Kyocera |

TABLE 1-continued

| Properties of the Ceramics | | | |
|---|---|---|---|
| Description | β-SiC Hexoloy SA | a/β SiAlON CM-200 | α-$Si_3N_4$ SN220 |
| Processing Method | Dry Pressed | Injecfion Molded | Hot Pressed |
| Dimensions (As Received) (mm) | 1 × 76 × 107 | 2 × 50 × 65 | 0.5 × 80 × 155 |
| Density (g/cm³)† | 3.10 | 3.25 | 3.20 |
| Coefficient of Thermal Expansion ($10^{-6}$/K)† | 4.1 | 3.4 | 3.2 |
| Elastic Modulus* (GPa) | 365 | 312 | 294 |
| Poisson's Ratio† | 0.14 | 0.27 | 0.28 |
| Flexural Strength* (MPa) | 358 ± 51 (12 tests) | 659 ± 109 (6 tests) | 573,495 (2 tests) |
| Fracture Toughness† (MPa m½) | 3.4 | 5.5 | 5.7 |

† Supplied by the manufacturer
*Measured values

The SiC layers 12 were ground from an initial thickness of about 1 mm down to about 0.5 mm and cut to the appropriate dimensions (typically about 12 mm×50 mm for flexural specimens and about 65 mm×100 mm for tensile specimens). For volume fraction studies, layers 12 were ground to thicknesses ranging from about 0.1 to 0.8 mm, depending on CMC layer 14 thickness and the desired ceramic volume fraction range.

The thicknesses of the SiAlON and $Si_3N_4$ layers 12 were originally about 2 and 0.5 mm thick, respectively. The SiAlON 12 layers were ground to about 0.5 mm and cut to the appropriate dimension (typically about 44 mm×60 mm).

The $Si_3N_4$ layers 12, previously ground to specification by the manufacturer, were cut to the appropriate dimensions (typically about 38 mm×150 mm).

Three types of CMC layers 14 were used, each reinforced unidirectionally with about 40% by volume of Nicalon fiber. The matrices were: (i) aluminosilicate glass (Corning 1723), (ii) calcium aluminosilicate (Corning CAS) glass-ceramic, and (iii) borosilicate glass-doped magnesium aluminosilicate (Corning MAS) glass-ceramic. Their properties are summarized in Table 2 below.

TABLE 2

| | Properties of the Fiber-Reinforced CMC Layers | | |
|---|---|---|---|
| CMC | Glass-Nicalon Composite | Glass-Ceramic-Nicalon Composite | Glass-Ceramic-Nicalon Composite |
| Supplier | Corning Incorporated | Corning Incorporated | Corning Incorporated |
| Description | Code 1723 glass matrix (amorphous) w/Nicalon fibers | Calcium alumino-silicate matrix (crystalline) w/Nicalon fibers‡ | BSG-doped magnesium aluminosilicate matrix (crystalline) w/Nicalon fibers‡‡ |
| Fiber Volume† Fraction (%) | ~40 | ~40 | ~40 |
| Processing† Method | Slurry infiltration | Slurry Infiltration | Slurry Infiltration |
| Density (g/cm³)† | 2.60 | 2.72 | 2.65 |
| Thermal Expansion Coeff of matrix ($10^{-6}$/K) of composite ($10^{-6}$/K) | 4.6 4.3 | 5.0 4.5 | 2.4 3.2 |
| Poisson's Ratio† | 0.25 | 0.25 | 0.22 |
| Elastic Modulus† (GPa) | 145 | 130 | 130 |
| Flexural Strength (MPa) | 681 ± 94* | 900# | 965† |

TABLE 2-continued

|  | Properties of the Fiber-Reinforced CMC Layers | | |
| --- | --- | --- | --- |
| Tensile Strength [0°] (MPa) | 680æ | 450§ | 440§ |
| Tensile Strength [0°/90°] (MPa) | 318æ | 230§ | 280§ |
| Apparent strain point† (° C.) | ~665 | ~1140 | ~940 |
| Apparent annealing† point (° C.) | ~710 | ~1245 | ~1090 |

*Measured value
†Supplied by Corning Incorporated
‡Chyung et. al., U.S. Pat. No. 4,615,987 (1986) and 4,755,489 (1988)
‡‡Gadkaree, U.S. Pat. No. 5,284,806
§F. Heredia, UCSB CMCs Survey 1990–1994 (1995)
æL. P. Zawada and L. M. Butkus, Ceram. Eng. Sci. Proc. 11 [9–10] 1592–1606 (1990).
D. B. Marshall and A. G. Evans, J. Am. Ceram. Soc. 68 [5] 225–234 (1985).

CMC layers 14 were produced by passing tows of fibers through a slurry containing an organic binder and the glass frit. The infiltrated tows were dried as a mat and subsequently cut into a number of approximately 150 mm×150 mm layers 14 by the manufacturer. Layers 14 were then cut to dimensions matching those of ceramic layers 12 and stacked to produce the desired layer thickness and fiber architecture.

The organic binder within layers 14 was removed by heating the stacked layers 12 and 14 at 500–600 deg. C. for more than 2 hours in a furnace with flowing nitrogen. Preliminary tests indicated that the carbonaceous decomposition products, resulting from binder burnout, remained on the surface of layers 14 when the nitrogen flow rate was low, leaving a visible gray film on layers 14. Laminated structures 10 produced using layers 14 had weak interfaces between ceramic layers 12 and CMC layers 14, leading to poor properties both in tension and flexure.

When the binder burnout was performed with substantially higher nitrogen flow rates, the carbonaceous decomposition products were removed from the furnace atmosphere and layers 14 appeared white with no evidence of any remaining decomposition products. Laminates 10 produced using white layers 14 had strong ceramic/CMC interfaces and exhibited good mechanical properties. All of the results discussed below correspond to materials with strong ceramic/CMC interfaces.

In preparation for bonding, ceramic layers 12 were cleaned with an organic solvent. Ceramic layers 12 were then alternated with layers 14 of the binderless CMCs as depicted in FIG. 1. In all cases, ceramic layers 12 were placed on both of the outer surfaces of laminate 10. The majority of materials developed were comprised of three ceramic layers 12 alternated with two CMC layers 14. CMC layers 14 were either unidirectional, or symmetric cross plies, i.e. fibers laid at 0 and 90 degrees to each other. In some instances, the laminates were comprised of five ceramic layers 12 alternated with four unidirectional CMC layers 14.

The unconsolidated stacked constituents were placed into a graphite mold between two graphite platens within a vacuum furnace. The furnace was evacuated to about $10^{-4}$ Torr vacuum and either kept under vacuum or back-filled with an inert gas (nitrogen or argon) during heating. The furnace was heated to a temperature near the softening point of the glass powder derived from the glass frit contained in layers 14. A pressure of about 2–10 MPa was then applied to laminate 10. The temperature was then raised further (1000–1100 deg. C., 1300–1400 deg. C. and 1200–1300 deg. C. for laminates containing 1723, CAS and MAS matrix materials respectively) to ensure full consolidation of the glass around the fibers and bonding of the glass to ceramic layers 12. Laminates containing either the CAS or MAS matrix materials were allowed to fully crystallize into a glass-ceramic during the heat treatment.

Following consolidation, the furnace was cooled slowly down to room temperature with the load being removed gradually below about 800 deg. C. Laminates 10 ranged in size from about 12 mm×about 50 mm to about 38 mm×about 150 mm.

Figure 2:
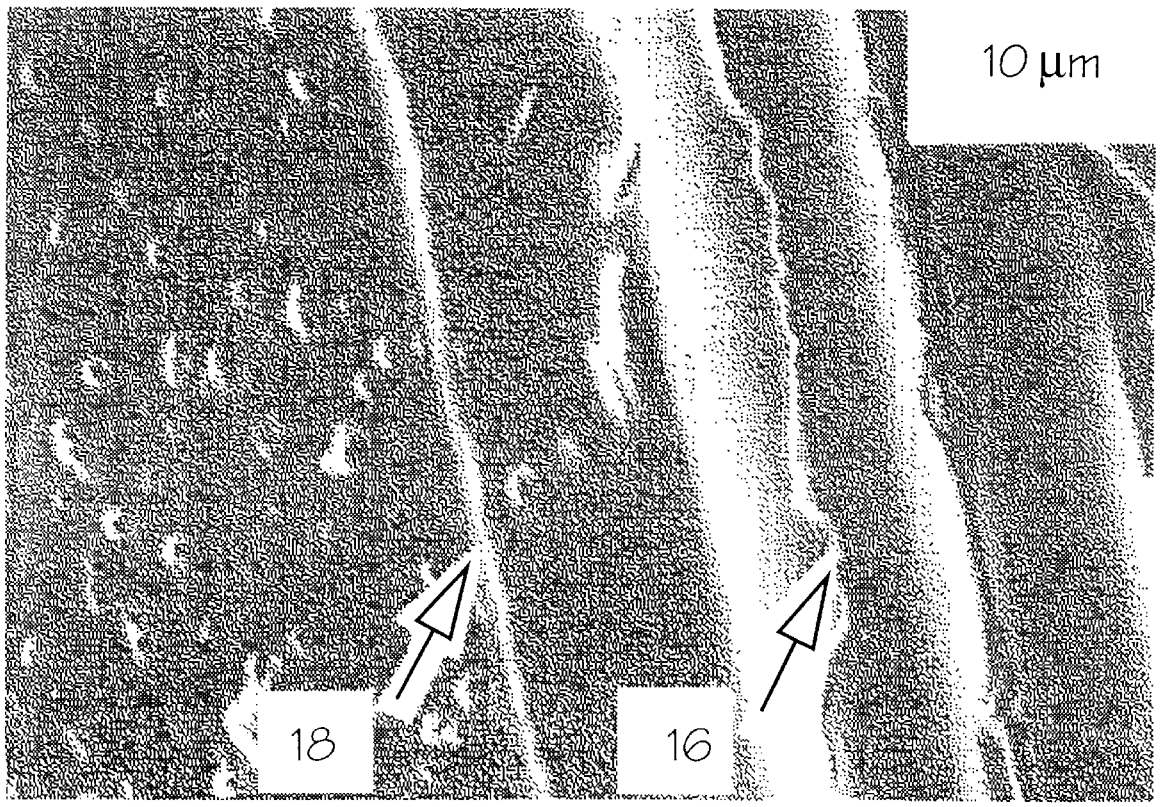
FIG. 2 depicts a transverse face of a SiC/1723-Nicalon laminate showing (a) a fiber-matrix interface which provides a crack deflection mechanism; and (b) a strong sintered ceramic-fiber layer interface.

During consolidation two interface are created as shown in the enlarged microphotograph of FIG. 2, namely a ceramic/CMC interface (ii) 16, which is well bonded, and a fiber/matrix interface (i) 18 which is crack deflecting due to a carbon-rich layer 20 which forms in situ at temperatures greater than 1000 deg. C. at the Nicalon/glass interface. See, K. M. Prewo, B. Johnson and S. Starrett, "*Silicon Carbide Fibre-Reinforced Glass-Ceramic Composite Tensile Behavior at Elevated Temperature,*" J. Mater. Sci. 24 (1989) 1373–1379. This carbon-rich layer 20 allows multiple cracking of the matrix without fiber fracture with debonding and sliding occurring along the fiber/matrix interface 18.

The formation of carbon-rich layer 20 during consolidation was demonstrated in the present study by heat treating some of the binderless, but unconsolidated CMC layers 14 at either 500 deg. C. or 750 deg. C. for two hours in air prior to consolidation. Under these conditions, any carbon-containing layers on the fiber surface would be expected to oxidize. Following consolidation, these heated treated CMC layers 14 exhibited the same mechanical response as those that had not been subjected to the oxidizing treatment, indicating that the carbon-rich layer had indeed been formed in situ during consolidation.

Combinations of these constituents have been used to produce four laminates 10 which are designated by their dense ceramic constituent first, followed by their CMC constituent: SiC/1723-Nicalon, SiC/CAS-Nicalon, SiAlON/MAS-Nicalon, and Si3N4/MAS-Nicalon. An attempt was made to combine SiC with unidirectional MAS-Nicalon, though this led to cracking of the ceramic following cooling parallel to the fiber direction. This observation is consistent with the large thermal expansion mismatch between the SiC and the CMC in the transverse orientation, which is dominated by the matrix (See Tables 1 and 2).

Figure 3:
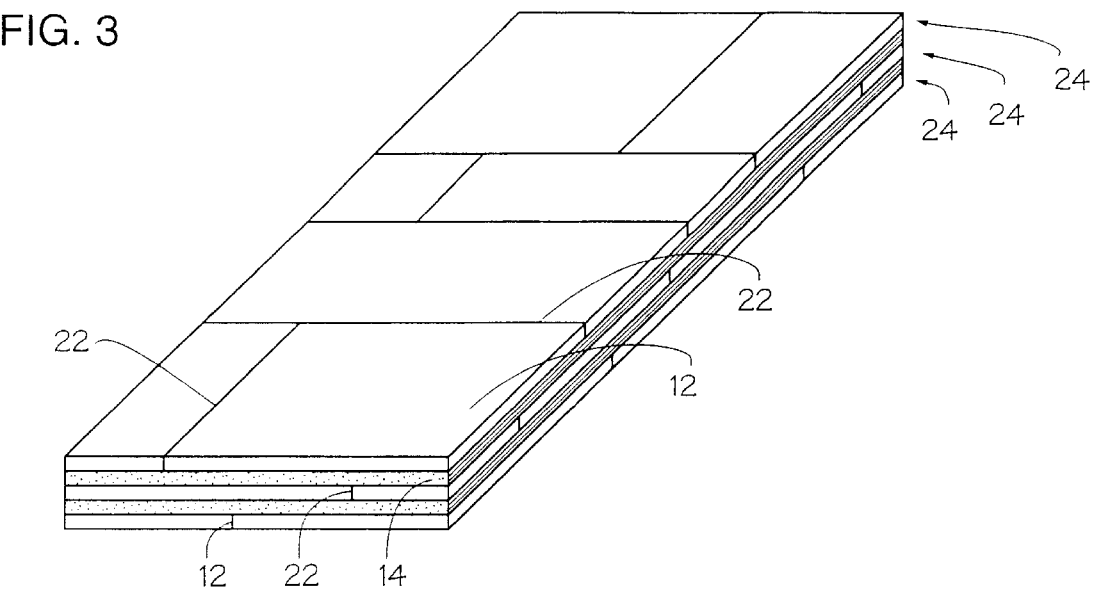
FIG. 3 is a schematic of a mosaic approach to creating larger laminates from discontinuous ceramic tiles.

It is understood that making larger and/or complex-shaped structures from these hybrid laminates 10 will require modifications to the approach presented here. Ceramic layers 12 presently available are generally limited in size and thus large layers within hybrid laminates 10 with continuous ceramic is not feasible. As an alternative, the laminate can be made up using a mosaic of numerous individual ceramic tiles within one ceramic layer. One such example is shown in FIG. 3, where the mosaic seams 22 are staggered between layers 12. This approach was used to create tensile specimens of FIG. 5 of SiAlON/MAS-Nicalon due to the limited size of the SiAlON layers 12 available, where the SiAlON layers 12 within each ceramic mosaic layer 24 were glued together using a cynoacrylate ester bonding agent to create continuous mosaic ceramic layers 24 before laying up laminate 10.

Figure 4A:
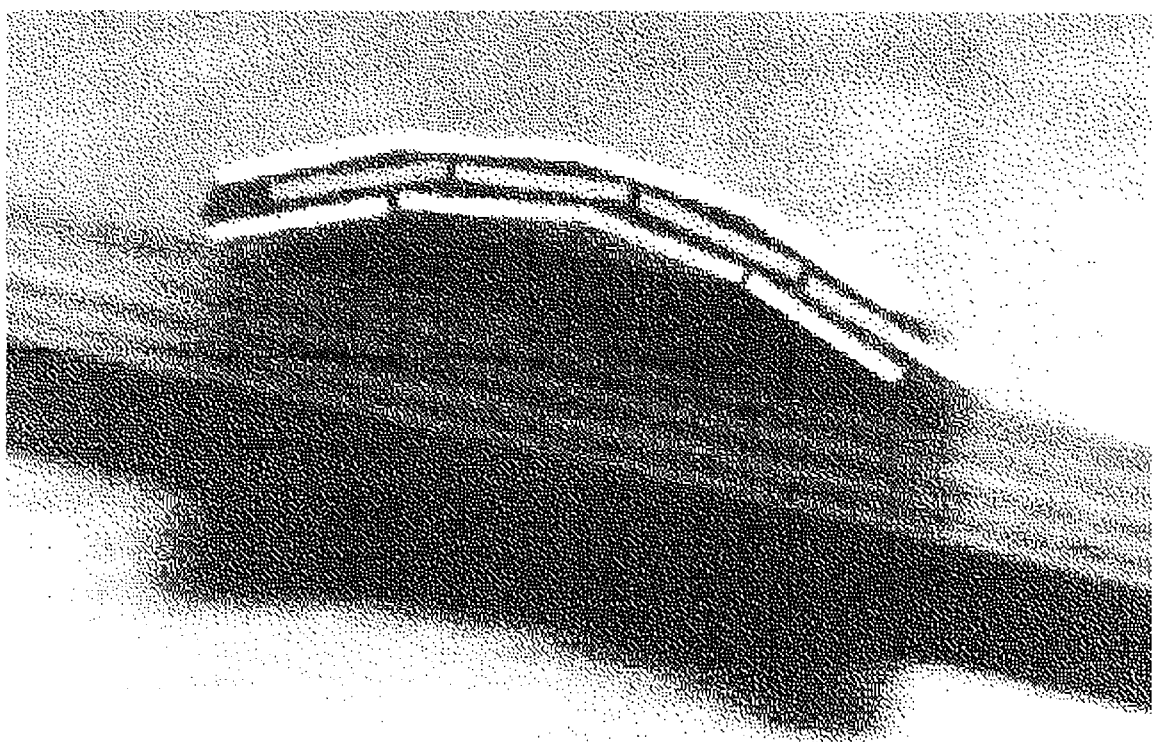
Figure 4B:
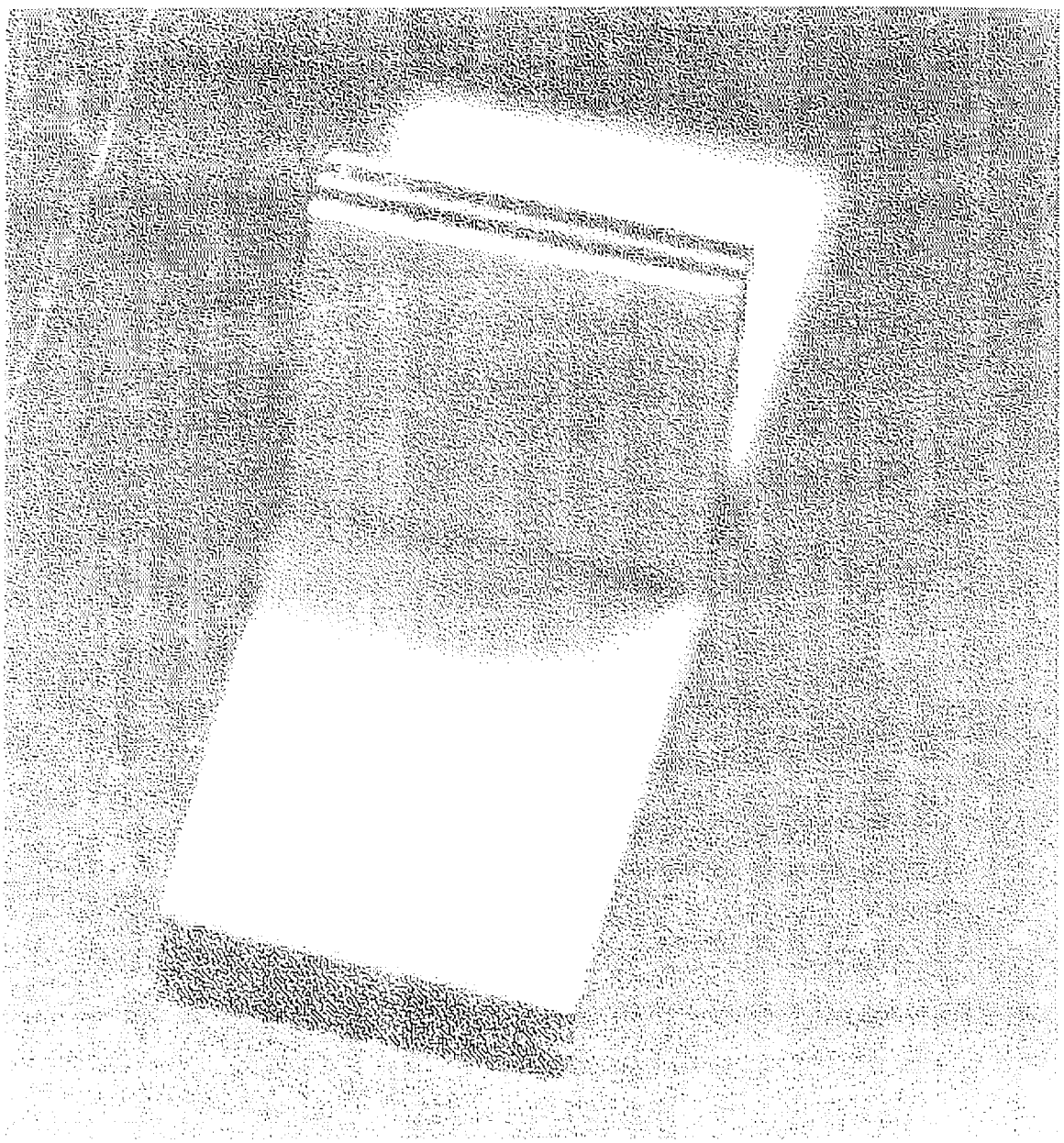

To create shaped laminates 10 using mosaics, the processing sequence was successfully modified to allow additional processing freedom. CMC layers 14 were consolidated using a mold with matched halves at a temperature below the crystallization temperature of the glass-ceramic powder. The consolidated, but uncrystallized CMC layer 14 was then stacked with alternating mosaic layers 24 of dense ceramic, which had been coated with a thin layer of matrix material in order to improve interfacial bonding. Laminate 10 was then bonded and crystallized as discussed previously. These ideas have been used in fabricating complex shapes, such as the curved section and T-section shown in FIGS. 4a and b. FIG. 4a is a side elevational view of a curved mosaic laminate 10 created with 0.1 psi pressure, and FIG. 4b is a perspective view of a T-shaped laminate 10.

Many applications envisioned for multilayer composites involve large components which would be difficult to make with continuous ceramic layers. Thus a brick and mortar approach could be taken to create larger structures. Such structures would need to be sealed, as shown in FIGS. 4c and d where adjacent ceramic sheets meet to prevent oxygen form migrating to the fiber-reinforced layers. This sealing process may be completed using glass-ceramics, ceramic precursors, electrophoretic deposition, or vapor deposition to fill in small joints between adjoining ceramic sheets. Such a sealing process could also be used to seal cracks induced in the ceramic during the life of the composite.

Figure 4E:
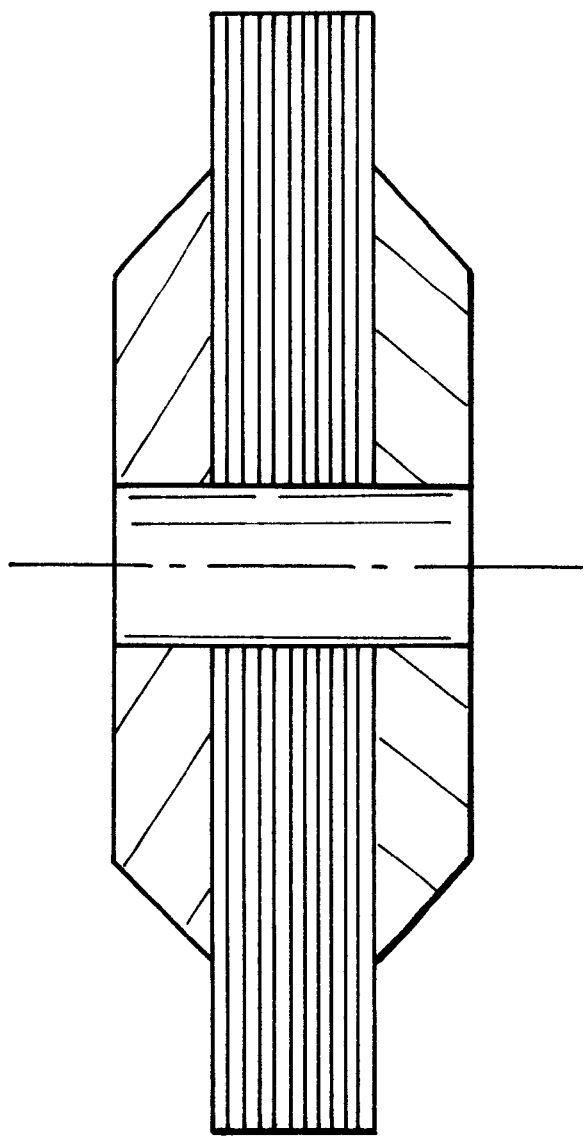

The present compositing scheme could also be used as a method of local reinforcement of conventional crossply or woven fiber-reinforced CMCs. In many composite panels, the stress concentrations associated with such holes invariably limit the mechanical performance of the structure. The local performance characteristics, e.g. first cracking stress, could be improved by transforming the area surrounding such discontinuities into a hybrid laminated composite as shown in FIG. 4e. Locally the structure would behave essentially the same as a hybrid multilayer, allowing the design stresses to be increase accordingly.

Silicon nitride sheets (alpha/beta-SiAlON—Ceramic Process Systems, Boston, Mass.) 2.0" by 0.5" were ground to 0.023" thickness using a diamond grinding wheel and cleaned with acetone. The fiber-reinforce layers (BSG-MAS/Nicalon, Coring Inc., Corning, N.Y.) were stacked four per layer and the binder was removed from the fiber-reinforced layers in flowing nitrogen. One fiber layer was sandwiched between to dense ceramic layers, wherein one ceramic layer had a seam in it to simulate a brick and mortar structure, and placed in the hot press. The composite was then consolidated at about 1250 deg. C. and about 350 psi in vacuum (10–6torr). The dense ceramic and the fiber layers had well matched coefficients of thermal expansion. The joint between two ceramic sheets was infiltrated with a polysilazanes (Pyrofine, Atochem, Paris, France), a silicon nitride precursor, then pyrolyzed and sintered at 1050 deg C. Three cycles were required to fill the joint as shown in FIG. 4d.

Four-point flexure tests were performed on rectangular bars cut from laminates 10 which typically contained about 50% CMC phase. The unidirectionally reinforced laminates 10 were cut parallel to the fiber direction. Laminates 10 with cross-ply reinforcements were cut such that the fiber layers closest to the outer surfaces were aligned with the applied tension. One transverse face of each bar was polished to a 1 micron finish to facilitate observation of cracking. The bars were typically about 6 mm wide and 50 mm long. The inner and outer loading spans were 20 mm and 45 mm, respectively. The ratio of beam height, h, to span difference, (So-Si), was typically kept well below 0.15. The tests were performed in displacement control at a rate of 0.05 mm/min. Typically, four flexural specimens of each laminate were tested. In some instances, surface replicas were taken of the polished face using a cellulose acetate layer and subsequently examined in an optical microscope. Strain gauges were applied to both the tensile and compressive faces in the constant moment region. Displacements were measured using the linearly variable differential transformer of the testing machine.

Elevated-temperature flexure tests were performed in an argon atmosphere in order to prevent oxidation of the CMCs. Following repeated evacuation and back-filling of the furnace with the argon, the furnace was heated at 10 deg. C./min. to the required test temperature. Once at temperature, the specimen was allowed to soak for a period of about 10 min. prior to loading. These tests were also performed in displacement control at a rate of 0.1 mm/min.

The flexural strengths of ceramic layers 12 were measured using the same loading geometry. These specimens were prepared in the same manner as hybrid laminates 10 in order to ensure similar flaw populations were present in both types of systems. Several tests were performed on each ceramic type listed in Table 1. Flexural strengths of three consolidated 1723-Nicalon CMC beams provided by the manufacturer were measured, since flexural curves for this material were not readily available in the literature.

Uniaxial tensile tests were performed on laminates 10 at room temperature on dog-bone shaped specimens, shown schematically in FIGS. 5a–c. The gauge length was 25 mm and the specimen width about 4–4.5 mm. The fillet radius adjacent to the gauge section was about 80 mm for the 100 mm long tensile specimens and about 200 mm for 150 mm long tensile specimens. Uniaxial tensile tests were also performed on about 7 mm wide specimens containing a center hole (about 2 mm dia.). Fiber-glass tabs with a 15 degree angle were attached to the specimen ends. The specimens were then loaded in a mechanical test machine using hydraulic wedge grips. The loading rate was 0.1 mm/min. Typically two tensile specimens of each type of laminate 10 were tested. In most cases, strain gauges were attached to two perpendicular faces of laminates 10 in order to determine the amount of bending during testing. One of the transverse faces was polished to a 1 micron finish, a clip gauge and strain gauge were attached to the second transverse face.

Rudimentary thermal shock tests were performed in the unidirectional SiC/1723-Nicalon laminates 10 containing five ceramic layers 12 alternated with four CMC layers 14. Bars were fabricated from laminate 10. The bars were about 6.5 mm wide and 50 mm long. The bars were heated at 10 deg. C./min. to the required temperature (21, 421, 521 or 721 deg. C.) then quenched into distilled water at room temperature (21 deg. C.). The broad face of the bar was kept parallel to the water surface as the specimen was quenched. For comparison, SiC bars with the same dimensions as the laminate were subjected to the same heating and quenching sequence (21, 221, 421, 621 deg. C.) into distilled water at room temperature (21 deg. C.). Following thermal shock, the laminates were examined in a optical microscope and subsequently tested in flexure to ascertain the retained properties.

The tests indicated that there exists a critical volume fraction of CMC needed to produce multiple cracking within both ceramic layers 12 and CMC layers 14. When multiple cracks are present, fracture proceeds in a "graceful" manner, with substantial inelastic deformation. In contrast, below the critical volume fraction, failure is dominated by the propagation of a single dominant crack. A predetermined volume percentage of fiber-reinforced CMC layers defines a critical level above which there is an increase in load bearing capacity after the onset of laminate cracking is observed.

Figure 6A:
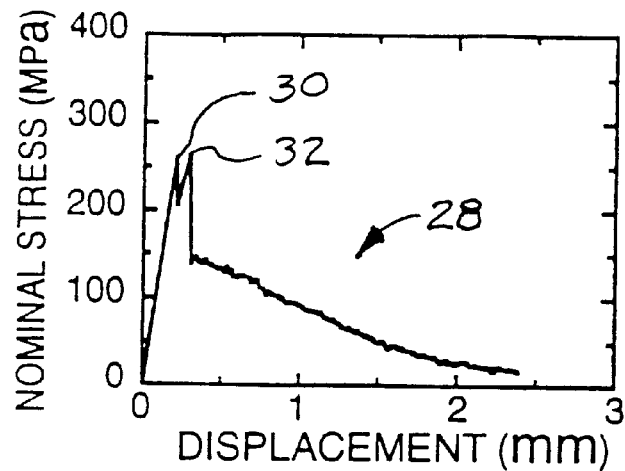
FIGS. 6a–c are graphs showing the effect of CMC volume fraction on SiC/1723-Nicalon laminate flexural response (stress vs. displacement) for fiber volumes of 25%, 40% and 50% CMC respectively, wherein an increase in load bearing capacity after cracking above a critical volume fraction.
Figure 6B:
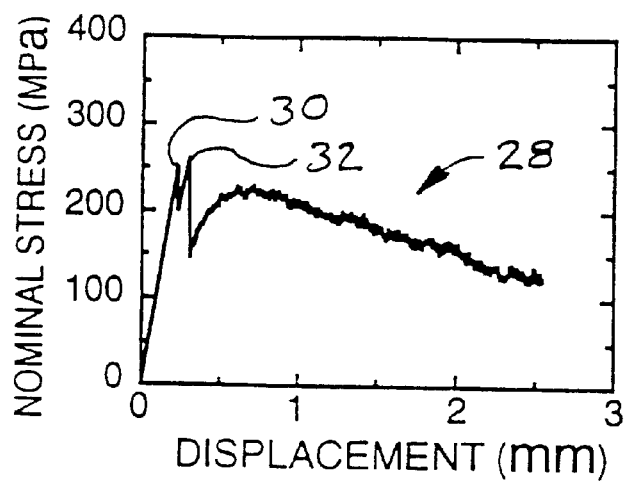
Figure 6C:
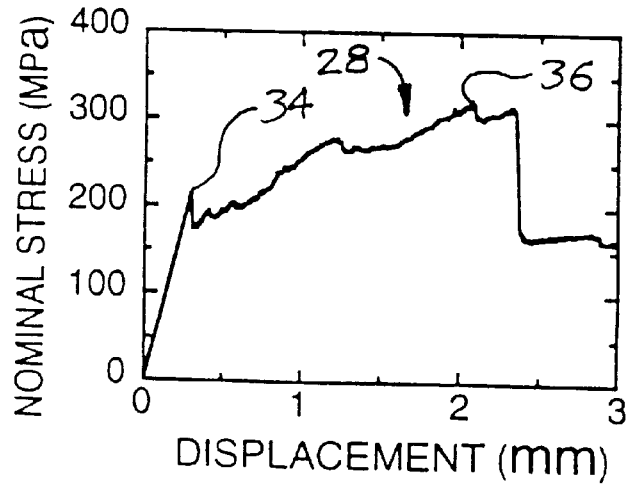

A series of measurements and observations demonstrating this transition in the SiC/1723-Nicalon system is presented in FIGS. 6a–c. At the lowest volume fraction (25%) shown in FIG. 6a, the flexural stress-displacement curve 28 is characterized by a critical stress 30 for the onset of cracking of the outermost SiC layer (280+ or −35 MPa) followed by either a progressive decrease in stress with displacement, associated primarily with fiber bridging and pullout within CMC layer 14; or followed by a modest load drop (~10–20%) before rising to a second critical stress 32 (comparable in magnitude to the first), corresponding to cracking of an inner SiC layer 12 before the leading to the displacement, associated primarily with fiber bridging and pullout within CMC layer 14.

At the intermediate volume fraction (40%) shown in FIG. 6b, the response is similar, with the exception of a slight increase in stress followed by delamination within CMC layer 14 and cracking of an inner SiC layer 12.

At the highest volume fraction (50%) as shown in FIG. 6c, multiple cracks are formed within each of the SiC layers 12, with the exception of the SiC layer 12 in compression, as damage progresses down through the beam with increasing nominal stress. This cracking is the result of a strong ceramic/CMC interface and a crack-deflecting mechanism in the CMC, and is manifested in an increase in the nominal stress required for deformation beyond the onset 34 of cracking. As a result, the peak stress 36 (340+ or −110 MPa) is substantially higher than that needed to initiate cracking (235+ or −40 MPa). On unloading, laminate 10 nearly returns to its initial planar shape, due to the unbroken compressive SiC layer 12.

Based on these preliminary results, the materials that were produced for subsequent studies contained a minimum CMC volume fraction of 50% specific for this system.

Figure 7:
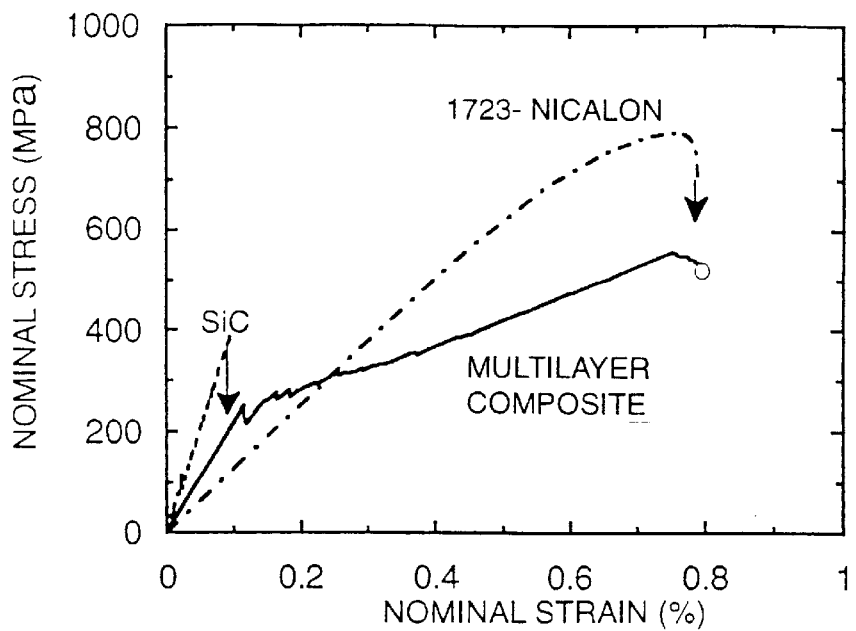
FIG. 7 shows the flexural response (stress vs. displacement) of SiC/1723-Nicalon as compared with its constituents.
Figure 8:
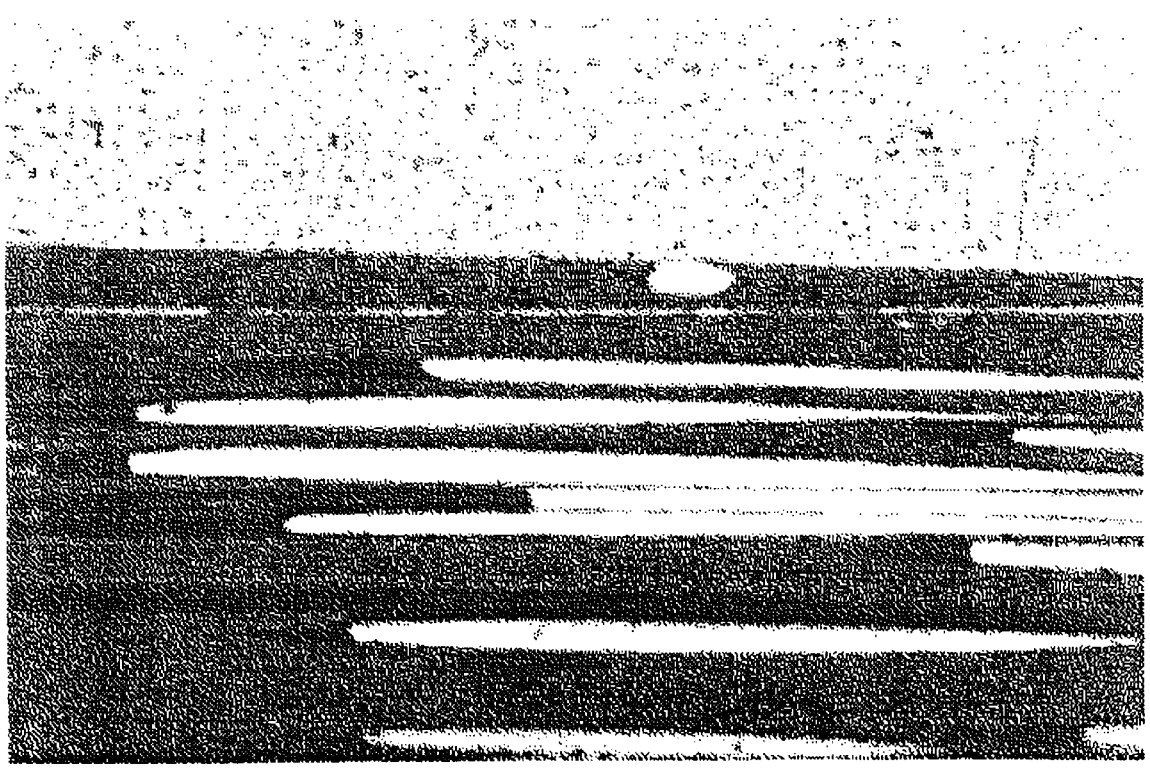
FIG. 8 is a photomicrograph of a "process zone" of cracks in the CMC layer (1723-Nicalon) emanating from a single crack in the dense ceramic (SiC) due to flexural loading, because of strong ceramic-fiber layer interface and crack deflection within the fiber layer.

A comparison of the flexural response of a unidirectional SiC/1723-Nicalon laminate 10 with those of its constituents is shown in FIG. 7. To account for slight differences in specimen dimensions and loading geometry, the results are presented in terms of the nominal flexural stress, $S_N$, and the nominal flexural strain, $e_N$, calculated on the basis of elastic bending (Folsom et al, 1994a). The relevant relations are:

$$s_N = 3P(S_o - S_i)/2bh^2 \quad (1)$$

$$e_N = 6dh/[((S_o - S_i)(S_o + 2S_i)] \quad (2)$$

where P is the applied load, b is the specimen width, h is the height, d is the load-point displacement, and $S_o$ and $S_i$ are the outer and inner spans, respectively. The elastic modulus of the laminate is approximately equal to the mean between the moduli of the SiC and the 1723-Nicalon, as expected for a laminate with 50% of each phase. The onset of cracking within laminate 10 occurs at a strain comparable to that of the SiC alone. However, the differences in moduli result in a substantial decrease in the cracking stress of the SiC within laminate 10 by approximately 30%. The cracks propagate across ceramic layers 12 and impinge on adjacent CMC layers 14, resulting in the formation of a damage zone within CMC layer 14 comprised of numerous matrix cracks as shown in the enlarged microphotograph of FIG. 8. The width and length of a process zone 26 increase with increasing load. The cracking stress in the CMC layer contained within the laminate is 2–3 times that observed in the crossply CMC layers alone.

Similar observations were made on the other laminate systems, in both tension and flexure. The relative crack spacing, l/t, where l is the crack spacing and t the layer thickness, within the SiC layers was typically about 1.5 for the layers located on the tensile face and about 2.2 for those located at the center.

Figure 9:
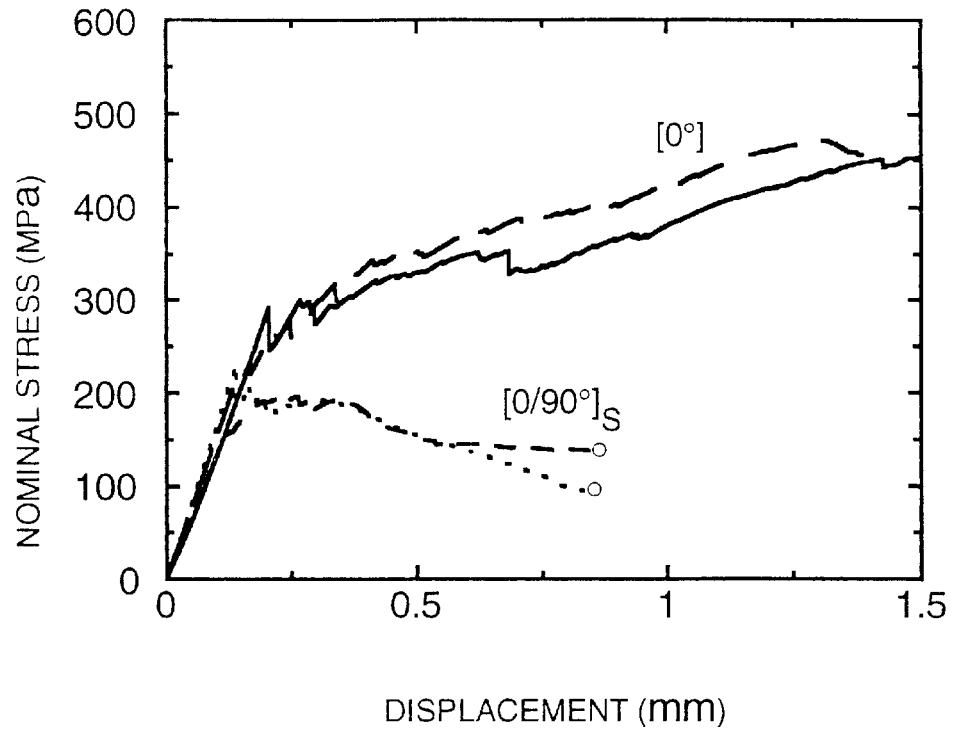
FIG. 9 shows the flexural response SiC/CAS-Nicalon laminates with both (52% CMC, [0]) and (59% CMC, [0/90]) fiber architectures.
Figure 10:
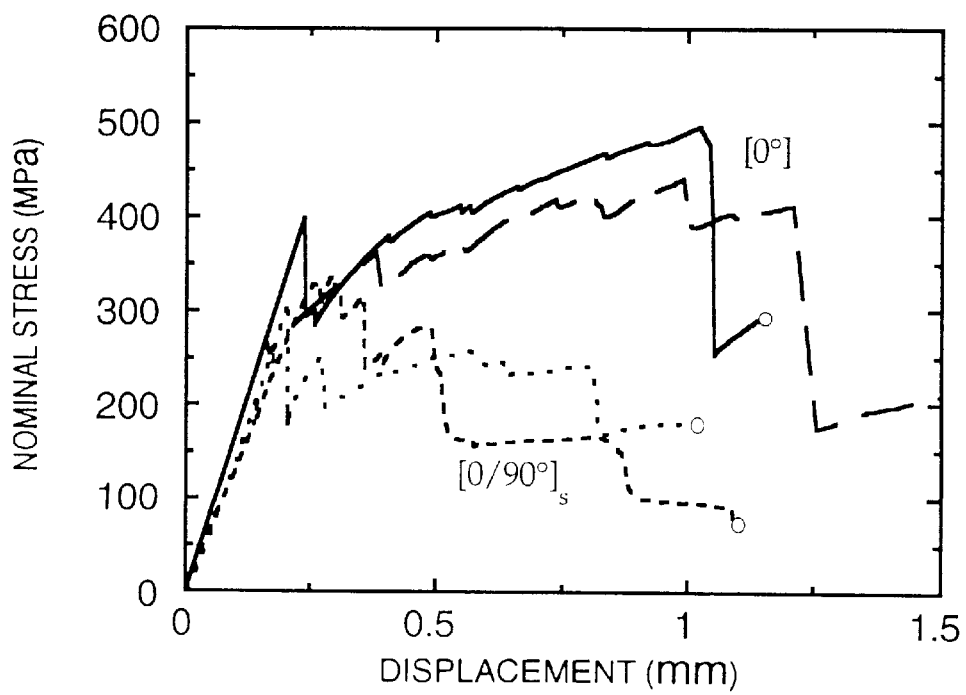
FIG. 10 is a graph of stress vs displacement showing the effects of fiber architecture on the flexural response of SiAlON/MAS-Nicalon laminates. [0 deg.] laminates have 53% CMC and [0/90 deg.] laminates have 60% CMC.

The effects of fiber architecture on the flexural response of both the SiC/CAS-Nicalon and the SiAlON/MAS-Nicalon are shown in FIGS. 9 and 10 respectively. The figures shows two representative curves from the about 5 tests performed on each material. The cracking stress (230+ or −50 MPa) in the two systems appear to be insensitive to fiber architecture, with initial crack formation occurring on the tensile surface of dense ceramic layers 12 at the failure strain of the relevant ceramic constituent. The SiAlON-based multilayers are characterized by a high cracking stress ( about 375+ or −98 MPa), typically 3–4 times that of that of the cross-ply CMC constituent alone. In the unidirectionally reinforced materials, multiple cracks form within the outer and central ceramic layers 12, giving substantial amounts of inelastic deformation. However, such cracking is more extensive in SiC-based materials than SiAlON-based materials. In the materials reinforced with crossply [0 deg. /90 deg. ] CMCs, a small number of cracks develop in dense ceramic layers 12, and fracture is typically dominated by the propagation of a single crack which initiates delamination within a 90 deg. layer.

Figure 11:
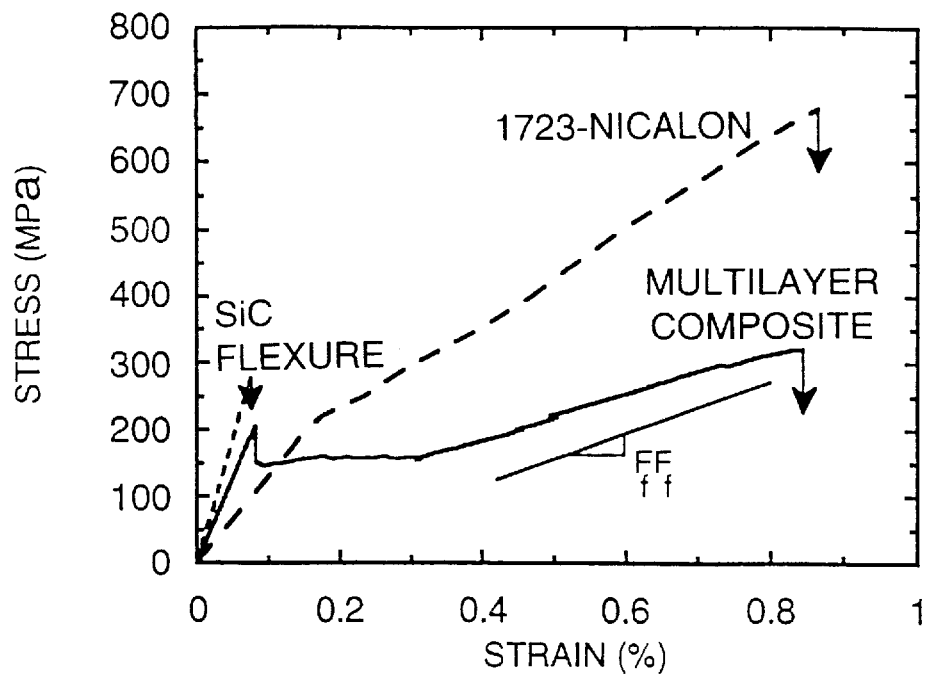
FIG. 11 is a stress-strain graph of the tensile response of a SiC/1723-Nicalon laminate. Also shown for comparison are the curves for the constituents.

A comparison of the tensile response of a unidirectional SiC/1723-Nicalon composite with those of its constituents is shown in the stress-strain graph of FIG. 11. The tensile stress-strain response exhibits many similar features to that seen in flexure. The onset of composite cracking (190+ or −20 MPa) occurs at the failure strain of the SiC. Multiple cracking of both constituents is seen at intermediate strain levels (0.3–0.4%), where cracking in dense ceramic layers 12 reaches saturation, resulting in a relative crack spacing, l/t, within each of SiC layers 12 of about 2.0.

On further loading, modulus measurements indicate that the properties of laminate 10 are dominated by the fibers within CMC layer 14. The composite failure strain is similar to that experienced by the CMC phase alone. The ultimate composite stress (300+ or −30 MPa) corresponds with the CMC ultimate strength and volume fraction.

Figure 12:
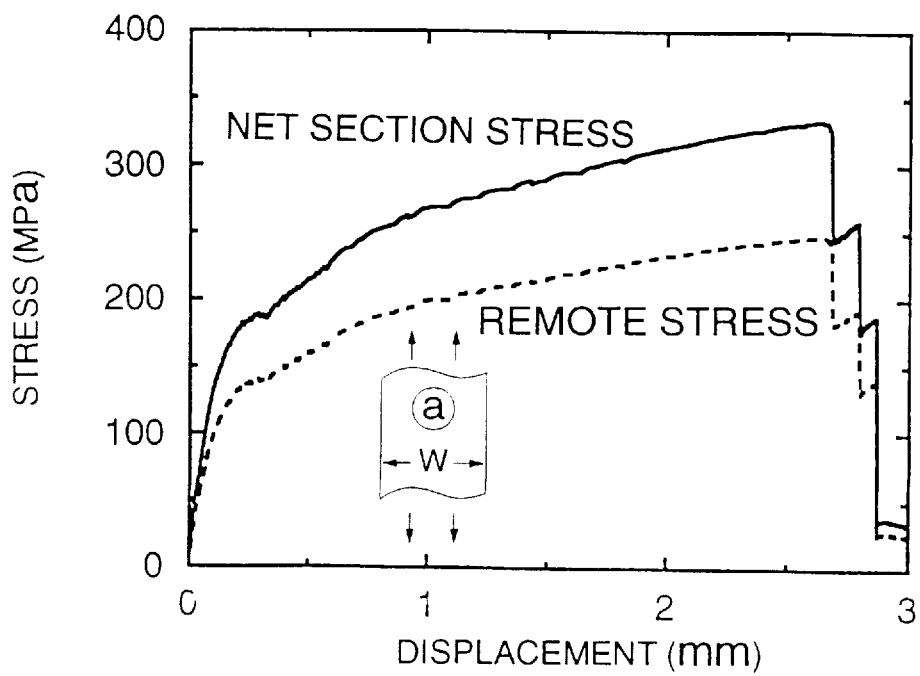
FIG. 12 is a graph of the tensile response of a SiC/1723-Nicalon laminate with a center hole (a/w=0.28), wherein notch insensitivity of laminate strength is depicted.

Tensile results for a SiC/1723-Nicalon laminate 10 with a center hole are presented in the graph of FIG. 12. Composite cracking initiated at the center hole as expected, due to the local stress concentration. However, the entire laminate 10 saturated with cracks with increasing applied stress, as in composites tested without holes. The net section stress for laminates 10 with and without holes is identical, suggesting that laminate 10 is notch insensitive.

Figure 13:
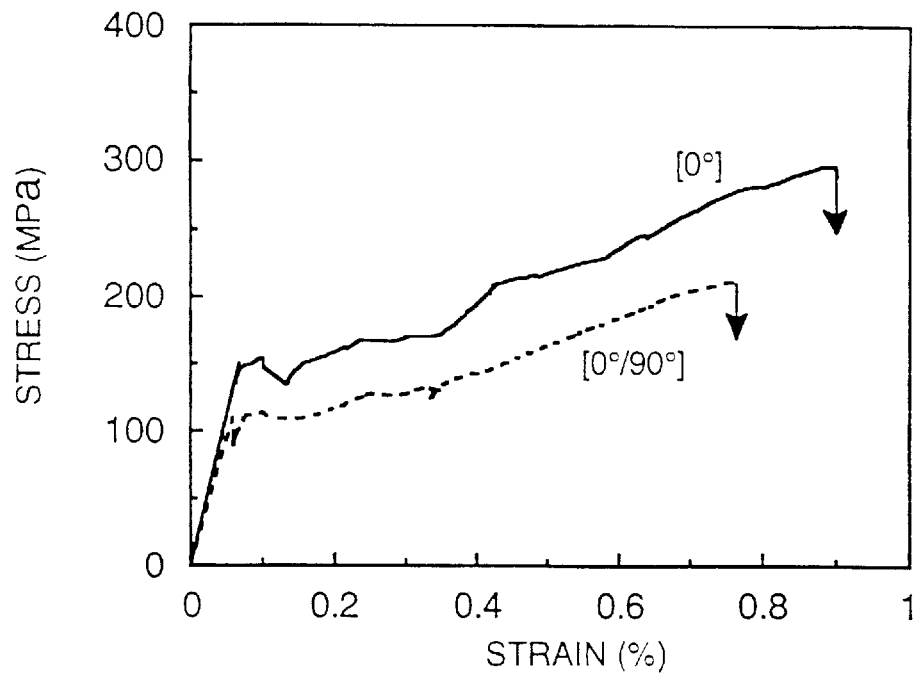
FIG. 13 is a graph of the tensile response of SiC/CAS-Nicalon laminates with [0 deg.] and [0/90 deg.] fiber architectures (65% CMC—75% of fibers in the loading direction).

Tensile results for SiC/CAS-Nicalon laminates 10 with unidirectional and crossply fiber architectures are displayed in the graph of FIG. 13. These laminates, regardless of their architecture, exhibit similar features previously observed in the tensile response of SiC/1723-Nicalon laminates. In both fiber architectures, cracks initiating from dense ceramic layers 12, travel undeflected, into CMC layer 14 producing a damage zone of cracks within CMC layer 14. The zone increases in size and density with increasing strain. Such behavior leads to multiple cracking of all constituents. The measured ultimate laminate stress and strain for multilayers correspond well with values expected from the constituent CMC properties and the CMC volume fraction in the loading direction.

Figure 14:
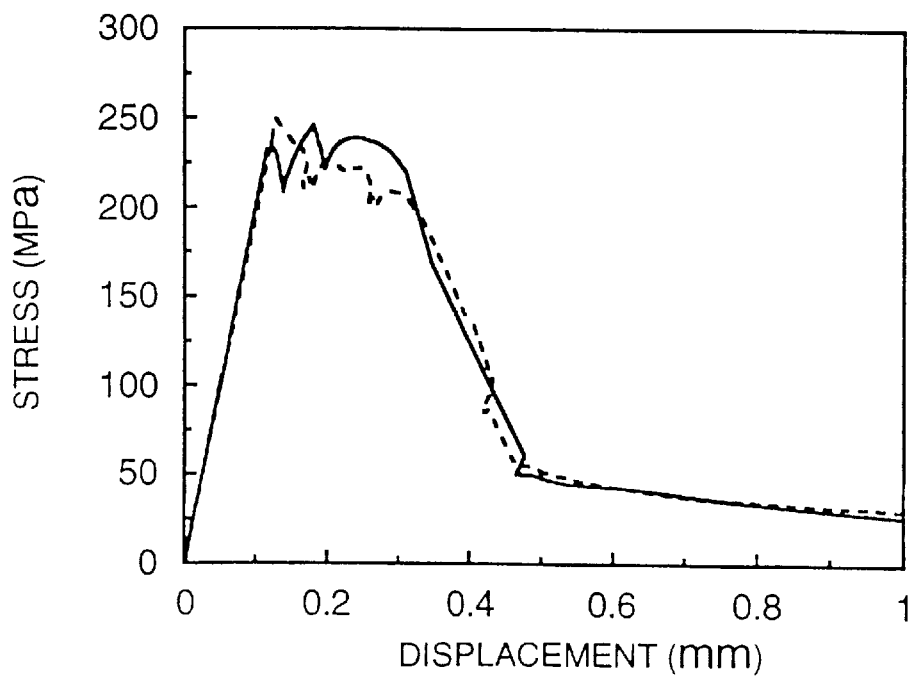
FIG. 14 is a graph of the tensile response of $Si_3N_4$/MAS-Nicalon (65% CMC phase) plotted as stress vs. displacement.
Figure 15:
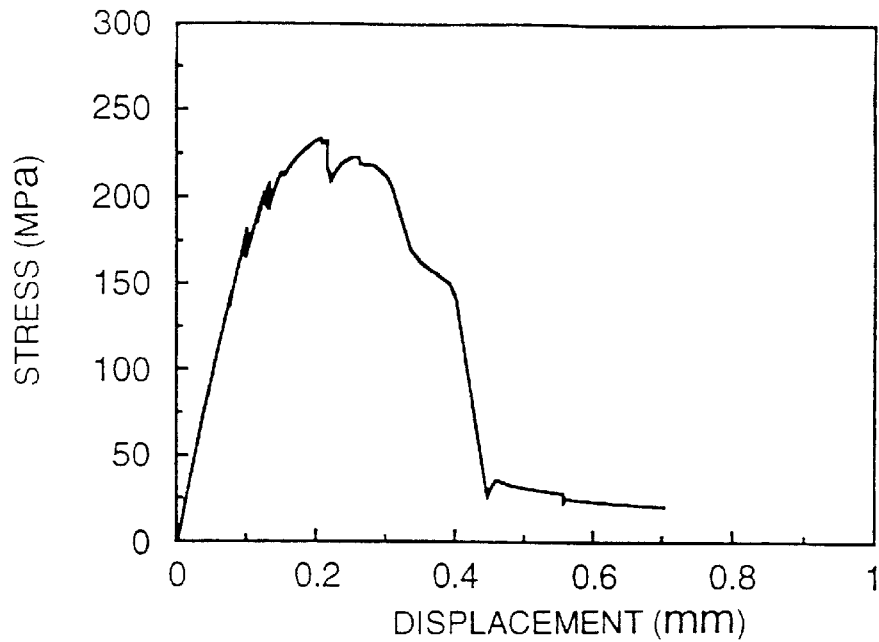
FIG. 15 is a graph of the tensile response of SiAlON/MAS-Nicalon (65% CMC phase) plotted as stress vs. displacement.

The $Si_3N_4$/MAS-Nicalon and SiAlON/MAS-Nicalon laminate 10 systems show markedly different tensile behavior as illustrated in FIGS. 14 and 15. The tensile behavior is plotted as stress vs. displacement as the linear-elastic response of laminate 10 is typically terminated by a dominant crack traversing the laminate. Little cracking is observed away from the initial crack plane in stark contrast to the multiple cracking behavior observed for these materials in flexural loading. This is also in contrast to observations for flexural and tensile loading of SiC-containing multilayers. No increase in load bearing capacity was observed afer initial cracking as the CMC volume fraction was below a critical value to promote ductile behavior. No damage of any kind was observed near the seams in the SiAlON-based laminates.

Figure 16:
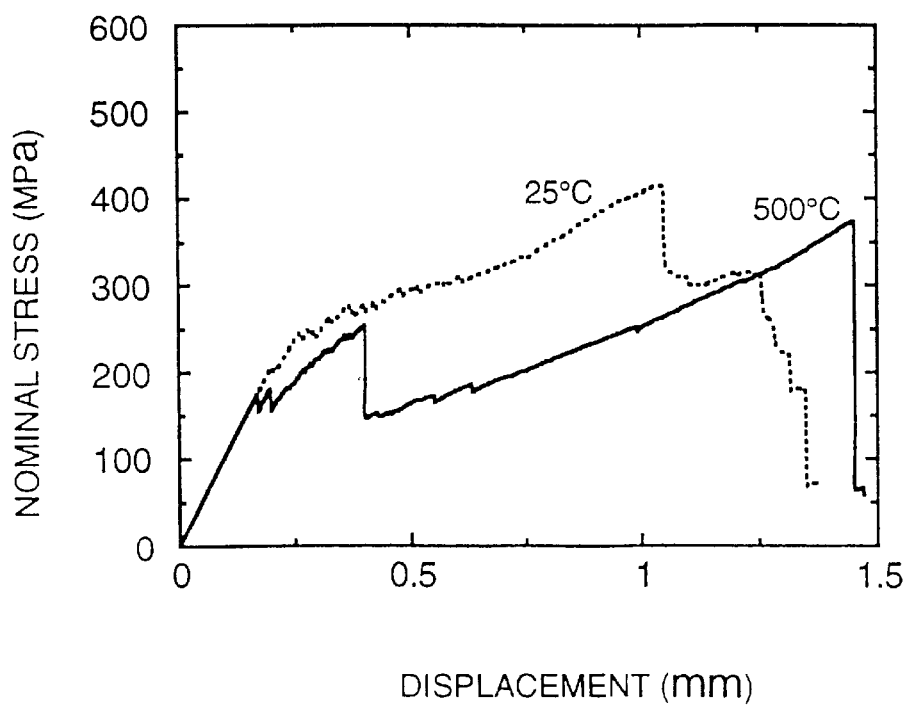
FIG. 16 is a graph of the flexural response of SiC/1723-Nicalon at 25 deg. C. and 500 deg. C. showing the similar features.

SiC/1723-Nicalon multilayers, which contain a glass matrix, were tested in flexure at 25, 500, 800 and 1000 deg.C. At 500 deg. C., the flexural response was similar to that at 25 deg. C. as seen in FIG. 16. However, at temperatures above the annealing point of the glass matrix (710 deg. C.) laminate strengths equal or less than 100 MPa were observed. In these cases failure occurred by cavitation and void formation near the ceramic/CMC interface.

Figure 17:
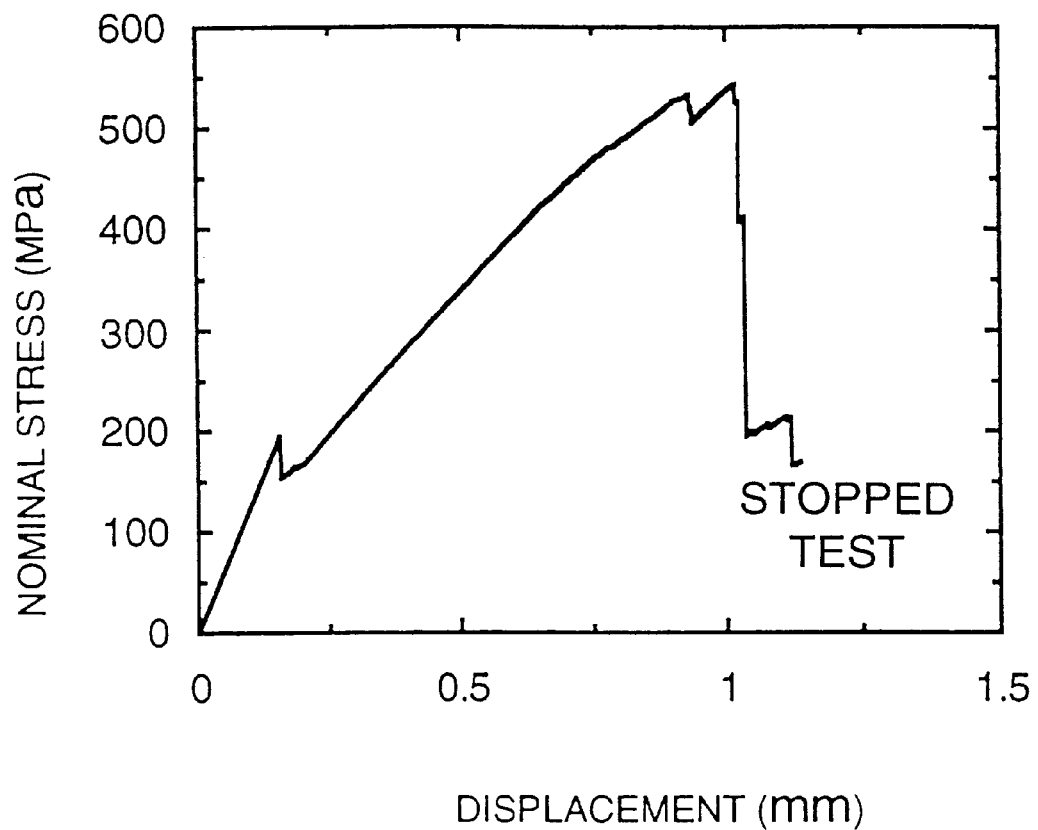
FIG. 17 is a graph of the flexural response of SiC/CAS-Nicalon at 1000 deg. C.

A SiC/CAS-Nicalon laminate 10, which contains a more refractory CMC phase, was tested at 1000 deg. C. The high temperature flexural results shown in FIG. 17 exhibit similar characteristics to flexural tests conducted at ambient temperature as shown in FIG. 9. Above this temperature, failure occurred by void formation within the fiber layers.

Figure 18:
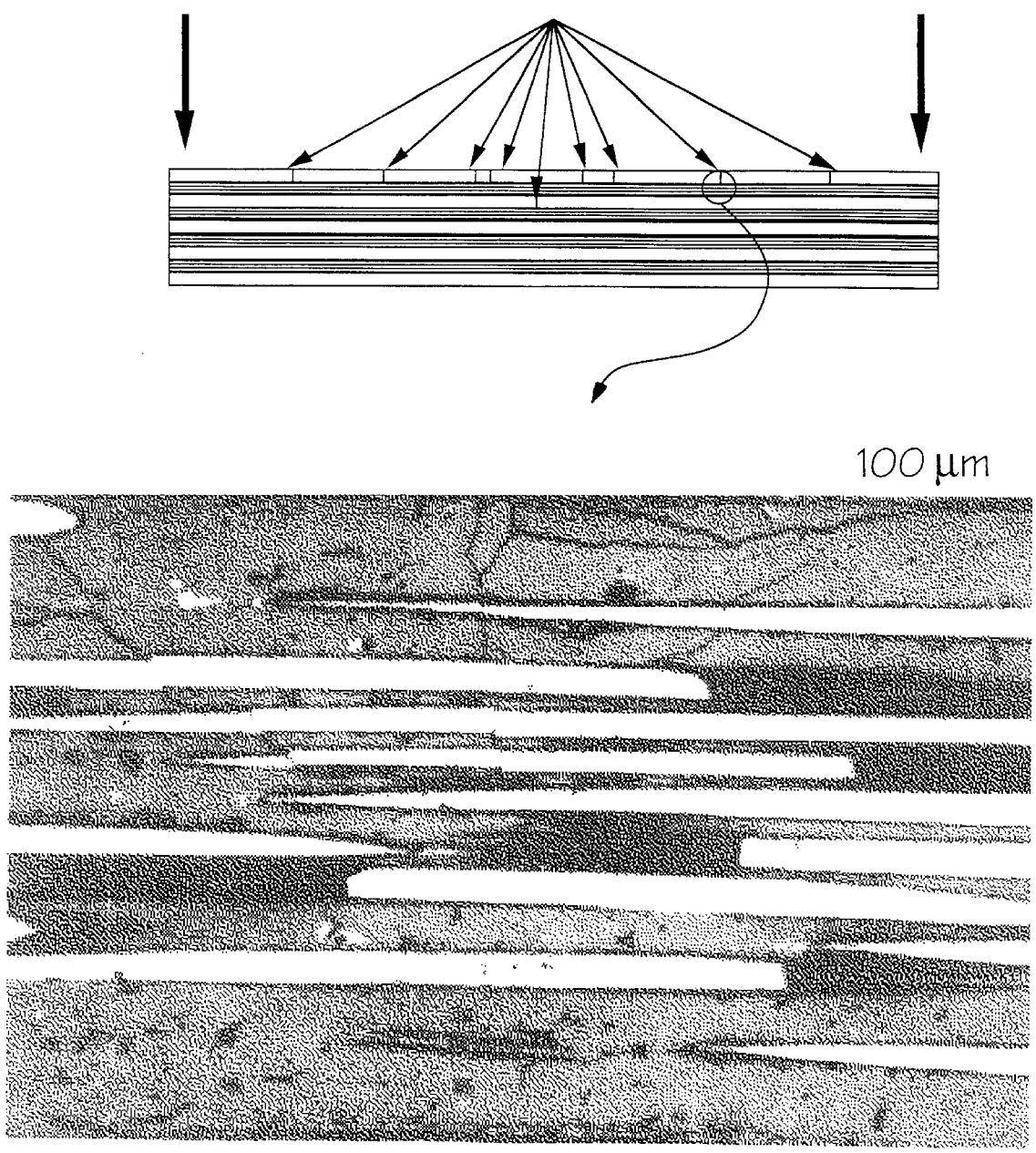
FIG. 18 is a schematic of SiC/1723-Nicalon laminate sample quenched at a temperature difference of 400 deg. C. illustrating limited damage behavior.

Thermal shock tests performed on the monolithic SiC at temperatures differences at or above 400 deg. C. resulted in catastrophic fracture. In contrast, the SiC-based laminates 10 containing CMC reinforcements (five dense SiC layers 12/four CMC layers 14) remained intact following temperature changes beyond differences of 750 deg. C. These laminates 10 contained numerous cracks within the outermost ceramic layers 12 showing similar damage tolerant behaviour to those tested in flexure. At these temperature differentials the ceramic tested alone were in pieces. A schematic of multilayer damage due to thermal shock treatments appears in FIG. 18.

Figure 19:
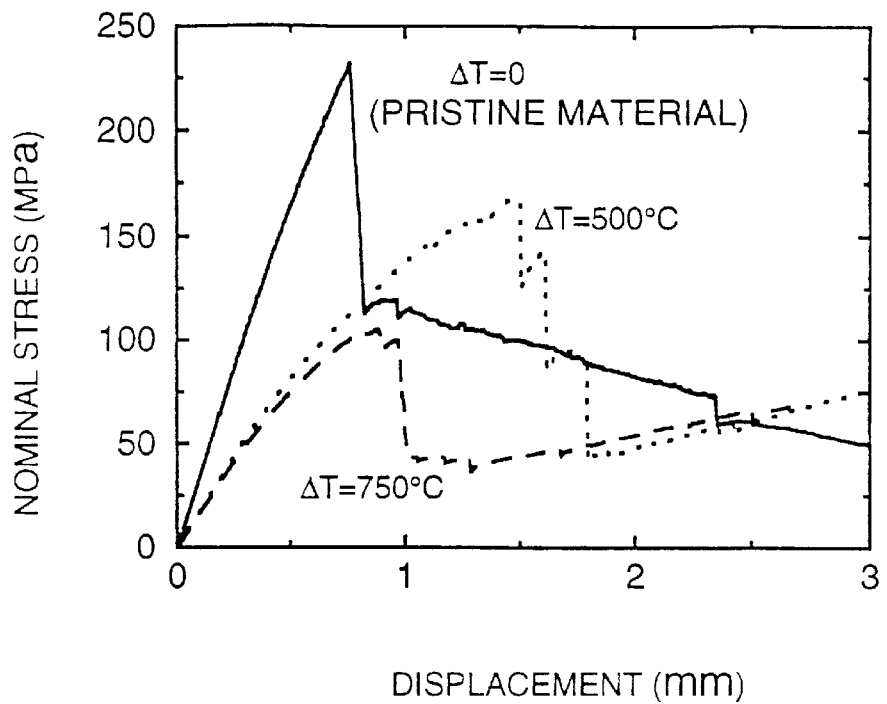
FIG. 19 is a stress-displacement graph of the retained strength of quenched SiC/1723-Nicalon laminates subjected to various temperature differentials.
Figure 20:
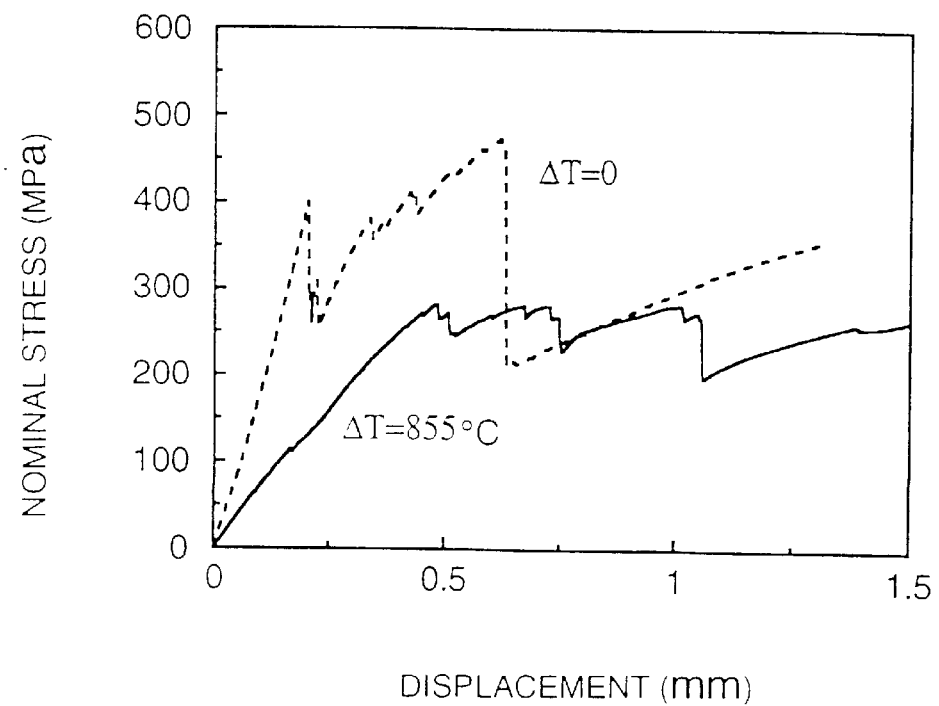
FIG. 20 is a stress-displacement graph of the retained strength of SiAlON/MAS-Nicalon laminate quenched at temperature differentials of 855 deg. C.

Upon subsequent mechanical testing, the quenched specimens exhibited a reduced modulus (about 50%) and a reduced strength (about 20%–50%) relative to the pristine material as illustrated in FIG. 19. Nevertheless, the inelastic displacements were comparable to those of the pristine material. Similar observations and measurements were found for thermally shocked SiAlON/MAS-Nicalon laminates 10 as shown in FIG. 20, which maintained about 75% of its original strength.

The mechanical response of laminates 10 in both tension and flexure is strongly dependent on their constituent properties and volume fraction. Regardless of the loading configuration, a linear-elastic response is observed up to some stress level, dominated by the high modulus ceramic. If the CMC volume fraction is below a critical level, no increase in stress is observed after initial cracking, a single crack dominates laminate failure, and CMC contributions are limited to fiber pullout.

In laminates 10 with CMC volume fractions above a critical level, an increase in stress is observed after initial cracking, as CMC layers 14 continues to shed load to dense ceramic layers 12, resulting in high ultimate stresses, and strains to a failure comparable to those of the CMC constituent alone. A large amount of energy is dissipated, as both constituents experience multiple cracking, resulting in a damage tolerant, notch insensitive laminate.

Figure 21:
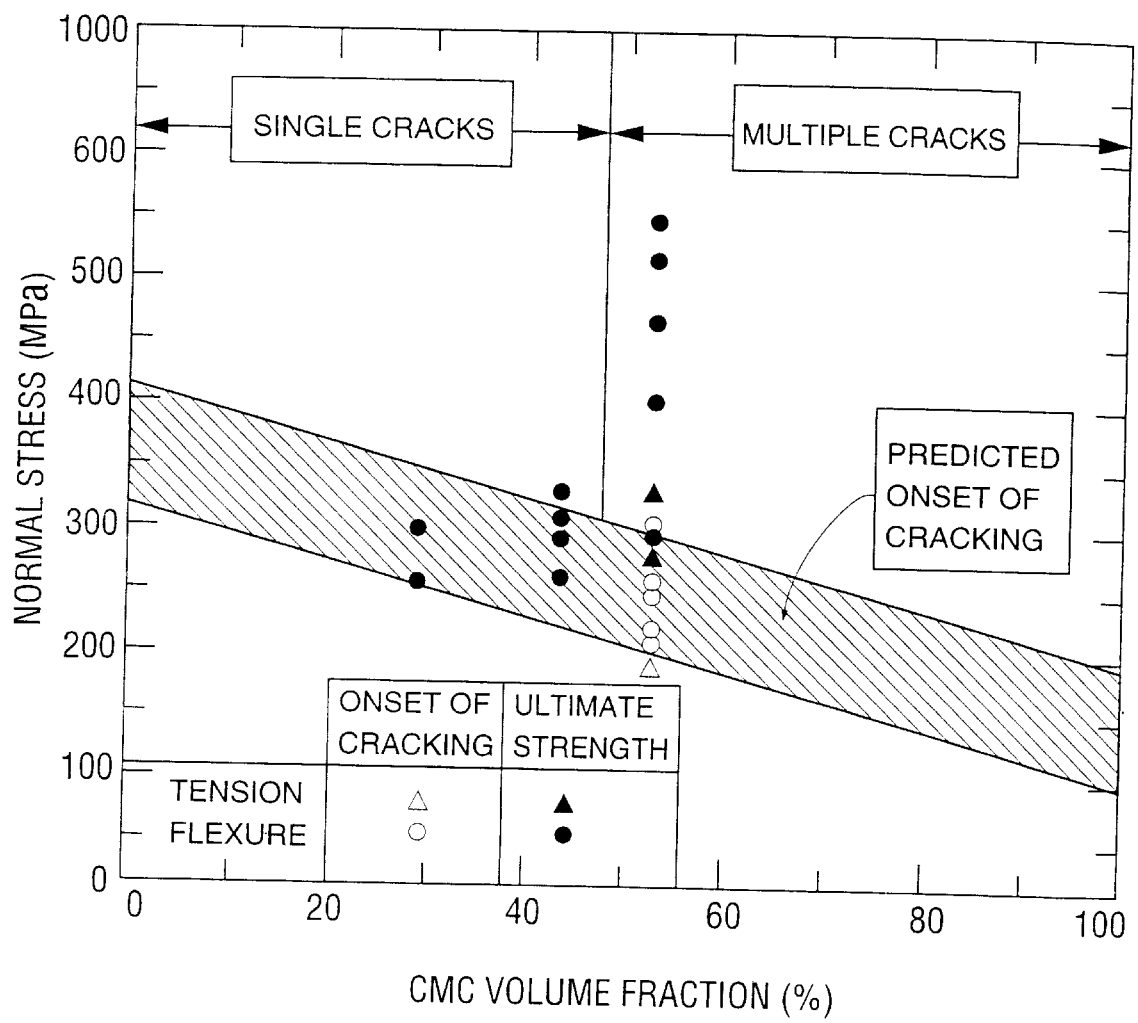
FIG. 21 is a graph of nominal stress vs. CMC volume fraction for SiC/1723-Nicalon laminates tested in flexure and tension.

This critical CMC volume fraction for unidirectionally reinforced SiC/1723 -Nicalon is shown in FIG. 21 as the vertical line on the stress versus CMC volume fraction. Similar results from SiC/CAS-Nicalon and SiAlON/MAS-Nicalon laminate systems are plotted in FIGS. 22–23 respectively, as a function of the CMC volume fraction.

Figure 22:
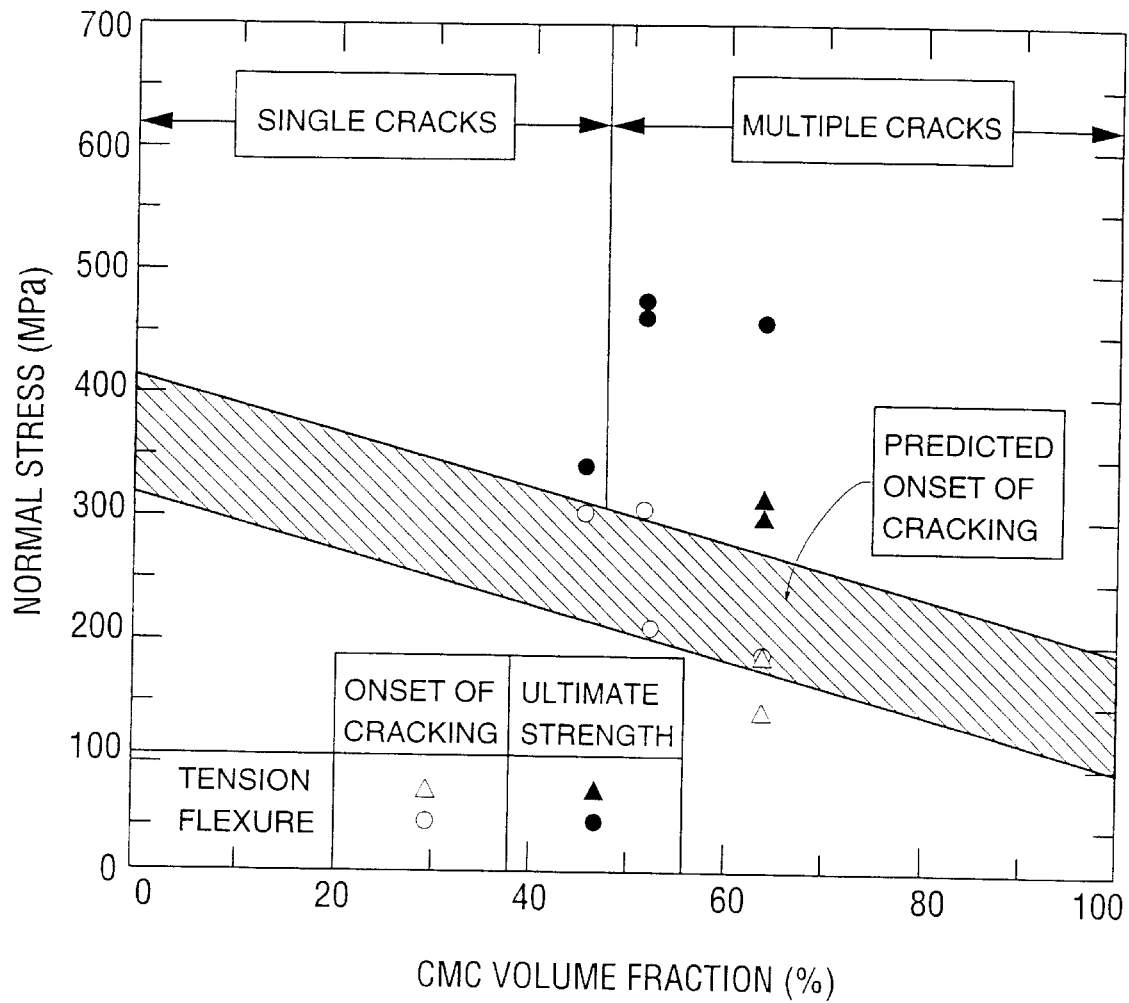
FIG. 22 is a graph of nominal stress vs. CMC volume fraction for SiC/CAS-Nicalon laminates tested in flexure and tension.

The predicted laminate cracking stress from is displayed as a shaded band on the graphs of FIGS. 21–23.This predicted onset of cracking is expressed as a band rather than line, reflecting the range of strengths exhibited by dense ceramic layers 12 in flexural loading. A delineation has been made between specimens exhibiting a single crack to failure, and those exhibiting multiple cracking. Such a delineation provides an empirical value for the critical CMC volume fraction.

The experimental data clearly show a declining trend in the onset of laminate cracking with increasing CMC volume fraction, as predicted. The measured onset of cracking generally lies within the predicted band, with the exception of some tensile data. Such discrepancies may be mitigated by measuring and using the tensile strength, rather than flexural strength, for prediction calculations.

The empirical CMC volume fraction to achieve laminate ductility in the SiC/1723-Nicalon and SiC/CAS-Nicalon systems lie in excess of about 42 and 48% respectively. These values are in reasonable agreement with the calculated tensile $f_{crit}$ values of about 40 and 52% respectively, assuming g is unity (no stress concentration due to ceramic cracking).

In the SiAlON/MAS-Nicalon system, while multiple cracking was achieved in flexural loading, multiple cracking did not occur in tension, suggesting $f_{crit}$ is dependent on the type of loading. This agrees with predictions for other types of hybrid laminates subjected to tension and flexure (Folsom et al,. 1994a). The measured onset of cracking is thought to be below the predicted tensile value, probably due to the large flaws induced on machining the dog-bone-shaped specimens. An empirical CMC volume fraction to achieve ductility in tension for SiAlON/MAS-Nicalon was never observed, in good agreement with the calculated $f_{crit}$ value of about 79%. This clearly represents the problems associated with reinforcing strong ceramics with weak reinforcements, a problem exacerbated in crossply architectures.

The high temperature behavior of laminates appears to be controlled largely by the properties of the matrix which bonds the constituent layers together. Use of more refractory CMC layers, preserves desirable laminate properties to elevated temperature levels.

The qualitative thermal shock resistance of laminated laminates is desirable. The observed damage in thermal shock is similar to that found in flexural loading. Such stepwise, graceful damage, results in adequate retained strengths and inelastic displacements. Such results suggest that a thorough study of thermal shock, using a more analytical approach (Faber, et al., 1981; and Schneider and Petzow, 1991) may be warranted on such materials.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A hybrid laminate comprising:
   a plurality of sintered ceramic layers; and
   a plurality of fiber-reinforced ceramic matrix composite (CMC) layers, each of said plurality of sintered layers alternating with each of said fiber-reinforced CMC layers, said plurality of sintered ceramic layers and fiber-reinforced CMC layers being bonded together to form a consolidated stack of layers,
   wherein the fiber-reinforced CMC layers comprise a means for deflecting cracks either at the fiber-matrix interface or within the matrix itself, and
   wherein the volume fraction of said fiber-reinforced CMC layers exceeds a predetermined critical level such that after the onset of laminate cracking, the load bearing capacity of the laminate continues to increase with additional straining.

2. The laminate of claim 1 wherein bonding between the sintered ceramic and fiber-reinforced CMC layers is stronger than bonding between the fibers and matrix within the CMC layers to create a preferential interface of crack deflection.

3. The laminate of claim 1 wherein said fiber s are aligned unidirectionally within said fiber-reinforced CMC layer.

4. The laminate of claim 1 wherein said fibers are aligned in a multidirectional pattern within said fiber-reinforced CMC layer.

5. The laminate of claim 1 wherein said sintered ceramic layer is comprised of at least one constituent selected from the group consisting of silicon carbide, silicon nitride, SiAlON, aluminum oxide, mullite, or similar carbides, nitrides, borides, and oxides.

6. The laminate of claim 1 wherein said fibers are comprised of at least one constituent selected from the group consisting of Nicalon , silicon carbide, graphite, glass, aluminum oxide, mullite, carbon and zirconium oxide.

7. The laminate of claim 1 wherein said matrix surrounding the fibers within the fiber-reinforced CMC comprise at least one constituent s elected from the group consisting of silica, glass, glass-ceramic, ceramics, carbides, nitrides, and oxides.

* * * * *

UNITED STATES PATENT AND TRADEMARK OFFICE
CERTIFICATE OF CORRECTION

PATENT NO.    : 6,025,048
DATED         : February 15, 2000
INVENTOR(S)   : Willard A. Cutler, Fred F. Lange, Francis W. Zok, Kenneth Chyung It is certified that error appears in the above-identified patent and that said Letters Patent is hereby corrected as shown below:

<u>Title page,</u>
Item [75], should read as follows:

INVENTORS: Willard A. Cutler, Corning, N.Y.; Fred F. Lange, Santa Barbara; Francis W. Zok, Goleta, both of Calif.; Kenneth Chyung, Painted Post, N.Y.

Signed and Sealed this

Eleventh Day of September, 2001

*Attest:*

*Nicholas P. Godici*

NICHOLAS P. GODICI
*Attesting Officer*        *Acting Director of the United States Patent and Trademark Office*

UNITED STATES PATENT AND TRADEMARK OFFICE
CERTIFICATE OF CORRECTION

PATENT NO.     : 6,025,048
DATED          : February 15, 2000
INVENTOR(S)    : Willard A. Cutler, Fred F. Lange, Francis W. Zok and Kenneth Chyung It is certified that error appears in the above-identified patent and that said Letters Patent is hereby corrected as shown below:

Title page,
Item [73], should read as follows:
-- ASSIGNEES:  The Regents of the University of California, Oakland, California; and Corning Inc., Corning, New York --

Signed and Sealed this

Twenty-seventh Day of August, 2002

*Attest:*

*Attesting Officer*

JAMES E. ROGAN
*Director of the United States Patent and Trademark Office*